(12) United States Patent
Terao

(10) Patent No.: US 7,813,829 B2
(45) Date of Patent: Oct. 12, 2010

(54) SHEET MANUFACTURING METHOD AND SHEET MANUFACTURING DEVICE

(75) Inventor: Jiro Terao, Kyoto (JP)

(73) Assignee: Toray Industries, Inc., Tokyo (JP)

( * ) Notice: Subject to any disclaimer, the term of this patent is extended or adjusted under 35 U.S.C. 154(b) by 319 days.

(21) Appl. No.: 12/095,419

(22) PCT Filed: Nov. 30, 2006

(86) PCT No.: PCT/JP2006/323885

§ 371 (c)(1),
(2), (4) Date: May 29, 2008

(87) PCT Pub. No.: WO2007/063927

PCT Pub. Date: Jun. 7, 2007

(65) Prior Publication Data

US 2009/0045536 A1    Feb. 19, 2009

(30) Foreign Application Priority Data

Nov. 30, 2005    (JP)    ............................. 2005-345354

(51) Int. Cl.
*G06F 19/00*    (2006.01)
*B29C 39/00*    (2006.01)
(52) U.S. Cl. ...................................... 700/155; 700/197
(58) Field of Classification Search .................. 700/155, 700/197
See application file for complete search history.

(56) References Cited

U.S. PATENT DOCUMENTS 5,059,265 A * 10/1991 Asakura ...................... 156/64
5,928,580 A * 7/1999 Nitta et al. .................. 264/40.4
2002/0175434 A1 * 11/2002 Uehara et al. .............. 264/40.5
2003/0050717 A1 * 3/2003 Hirata et al. .................. 700/90
2006/0126369 A1 * 6/2006 Raghuram .................... 365/51
2006/0244167 A1 * 11/2006 Trommelen et al. ........ 264/40.1

FOREIGN PATENT DOCUMENTS

| JP | 10-044231 A | 2/1998 |
| JP | 2002-86539 A | 3/2002 |
| JP | 2003-089146 A | 3/2003 |

OTHER PUBLICATIONS

International Search Report dated Feb. 20, 2007, application No. PCT/JP2006/323885.

* cited by examiner

*Primary Examiner*—Albert DeCady
*Assistant Examiner*—Sivalingam Sivanesan
(74) *Attorney, Agent, or Firm*—RatnerPrestia

(57) ABSTRACT

A sheet manufacturing method is provided including the steps of (i) extruding a sheet material to a sheet form; (2) forming a desired sheet by performing a predetermined processing involving dimensional change in a transverse direction of a sheet; (3) measuring a thickness distribution in the transverse direction of the sheet before completion and after completion of the predetermined processing; (4) calculating a manipulated variable corresponding to each measuring position based on a thickness distribution measurement value in the transverse direction of the sheet after completion of the processing; and (5) controlling the thickness of the sheet. In the calculation of the manipulated variable of step (4), a correspondence position in the transverse direction of the sheet after completion of the processing is determined, and a thickness control is performed based on the determined correspondence position in the transverse direction of the sheet.

15 Claims, 10 Drawing Sheets

[Fig. 1]
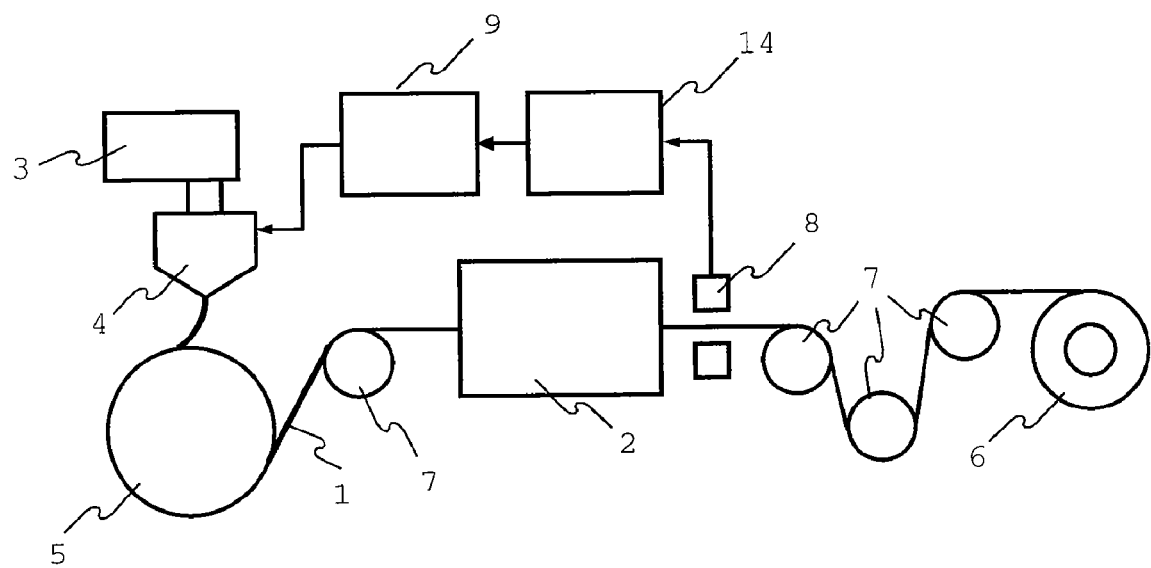
[Fig. 2]
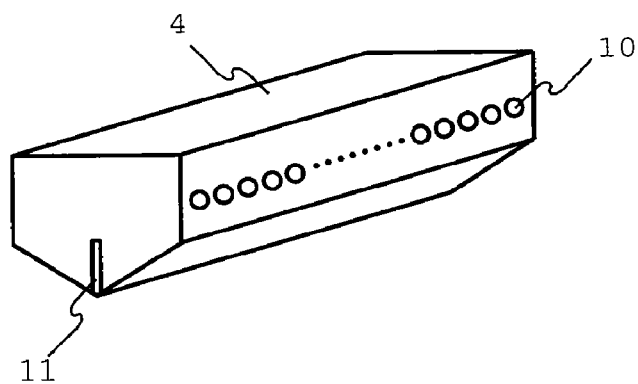

[Fig. 3]
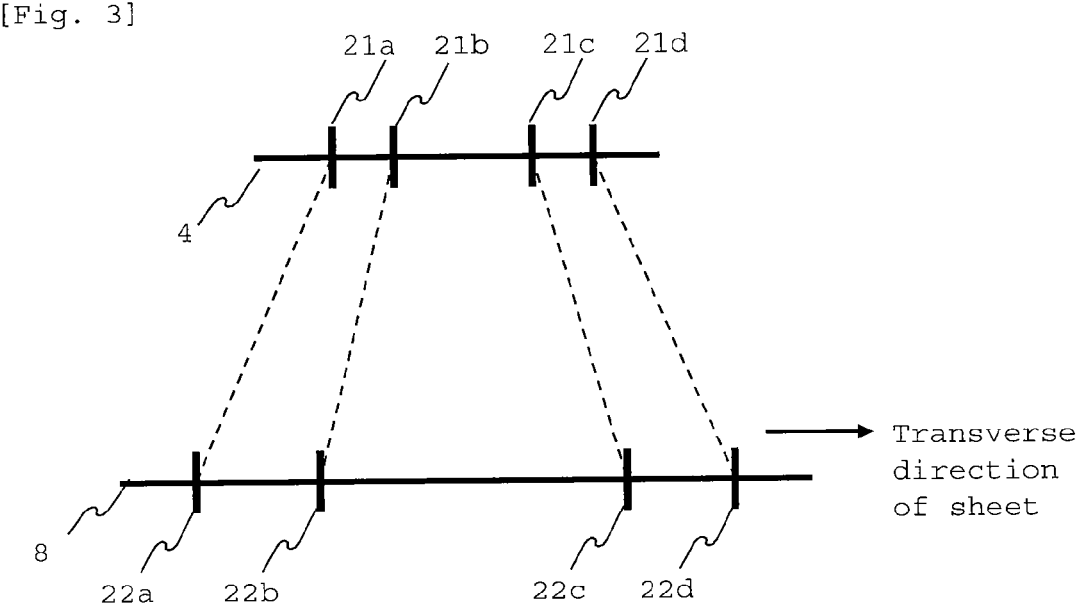
Transverse direction of sheet
[Fig. 4]
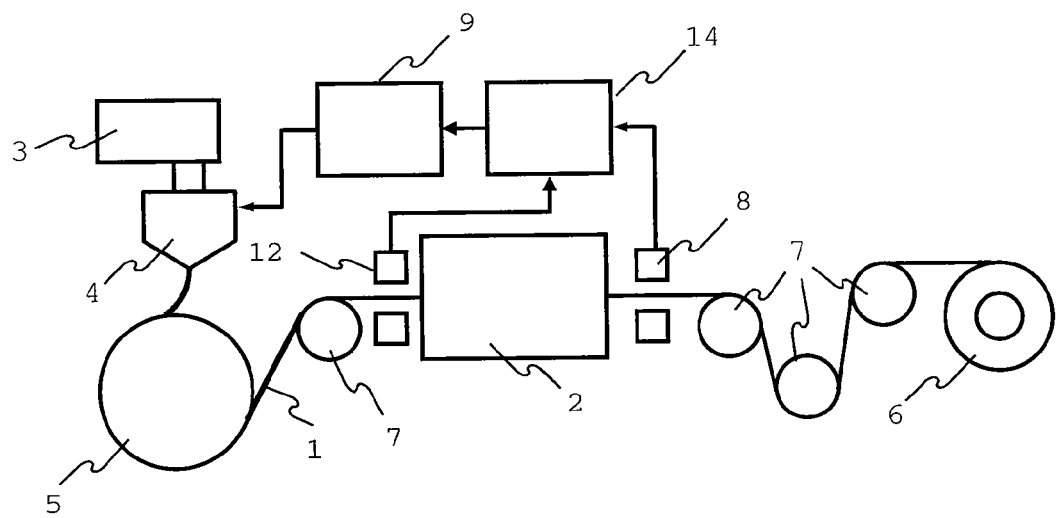

[Fig. 5]
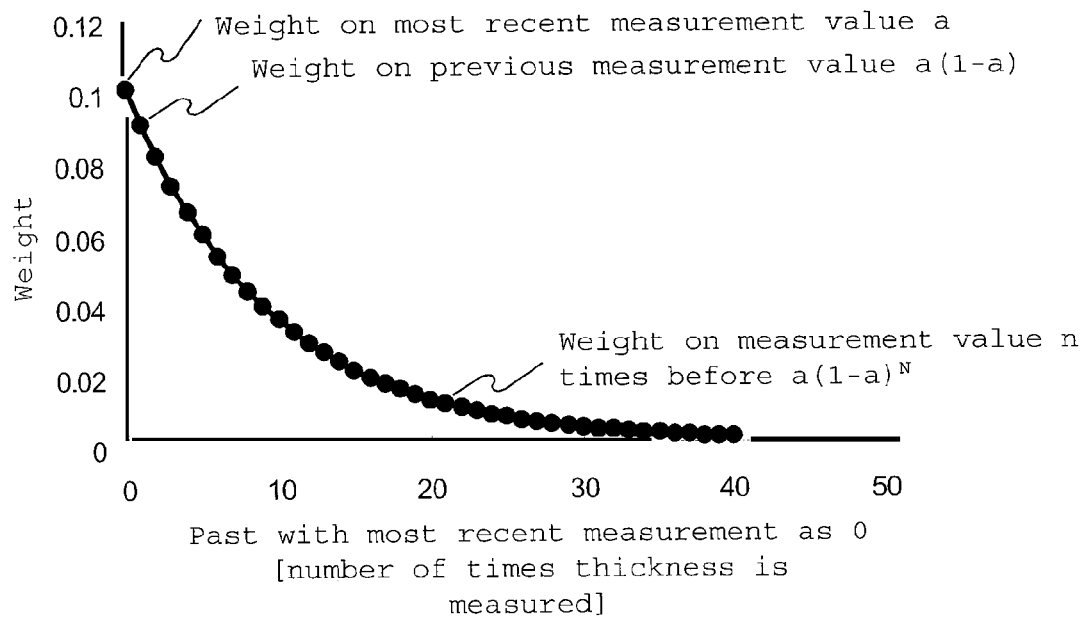

[Fig. 6]
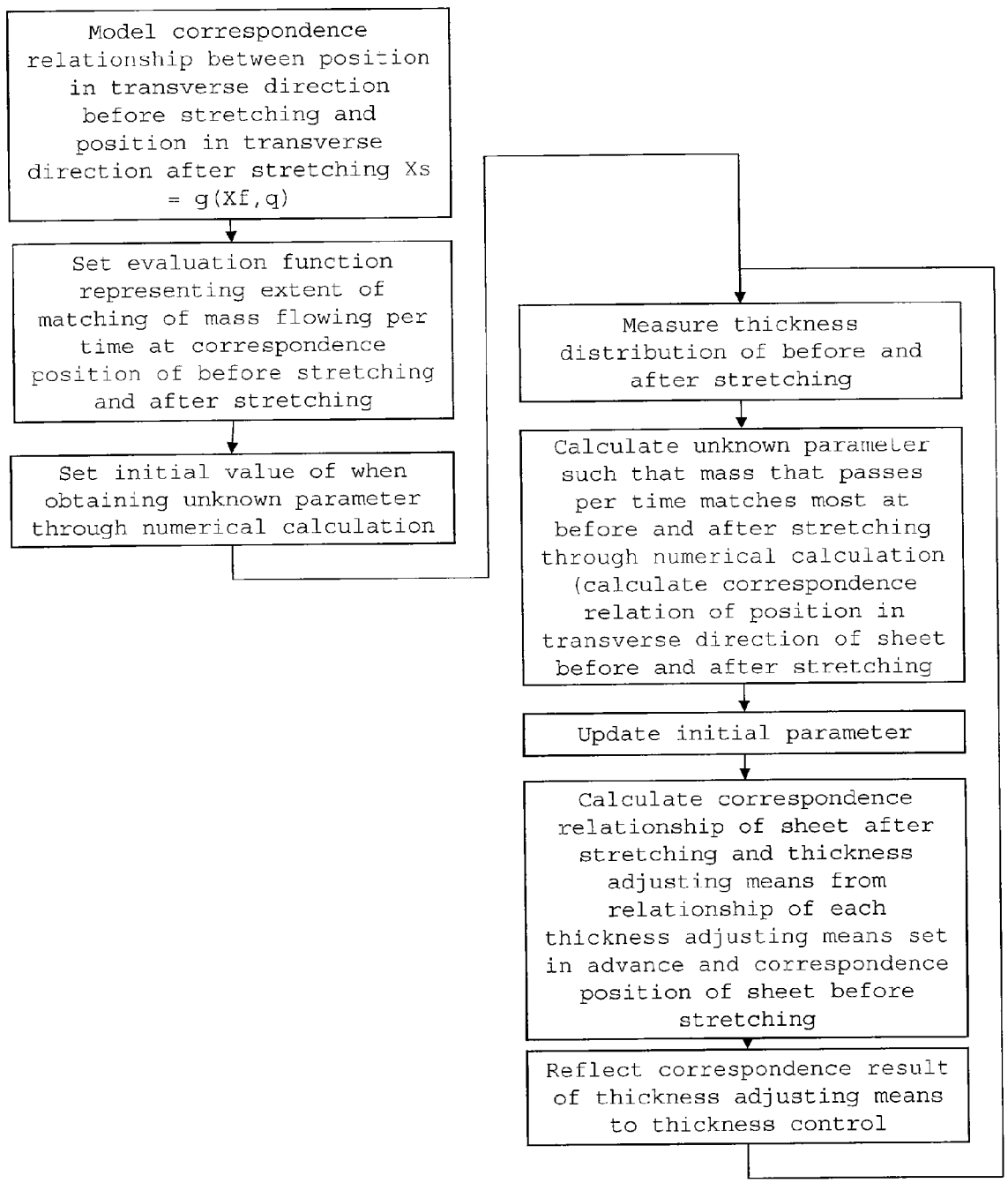

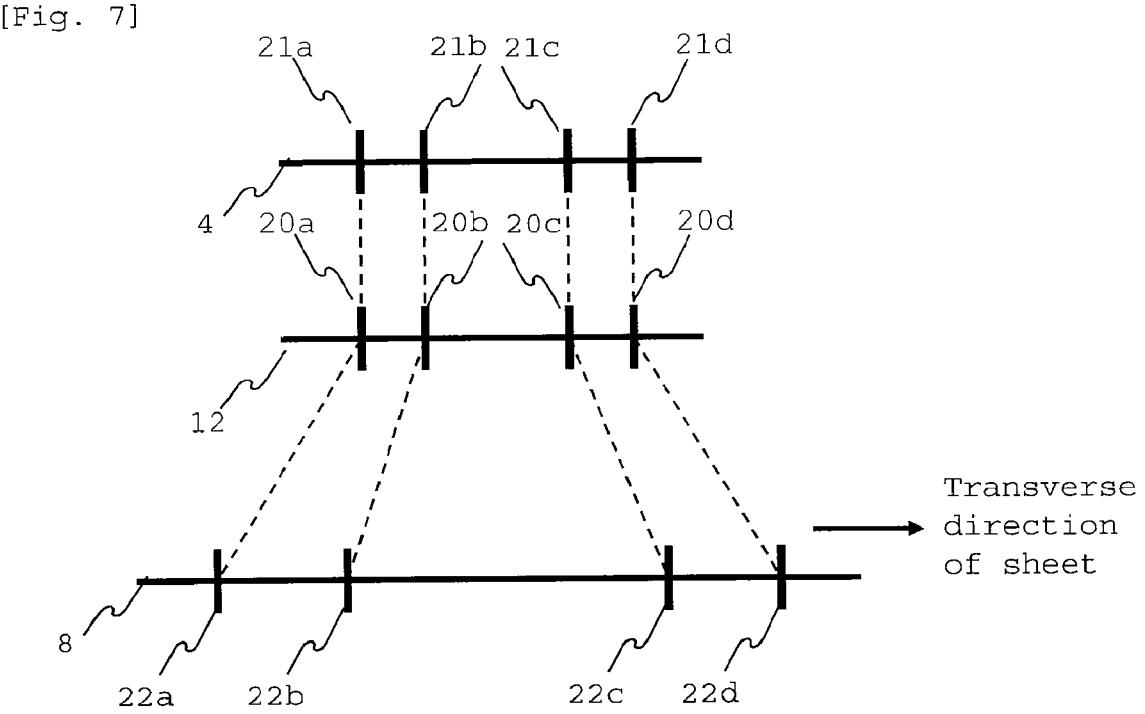

[Fig. 8]
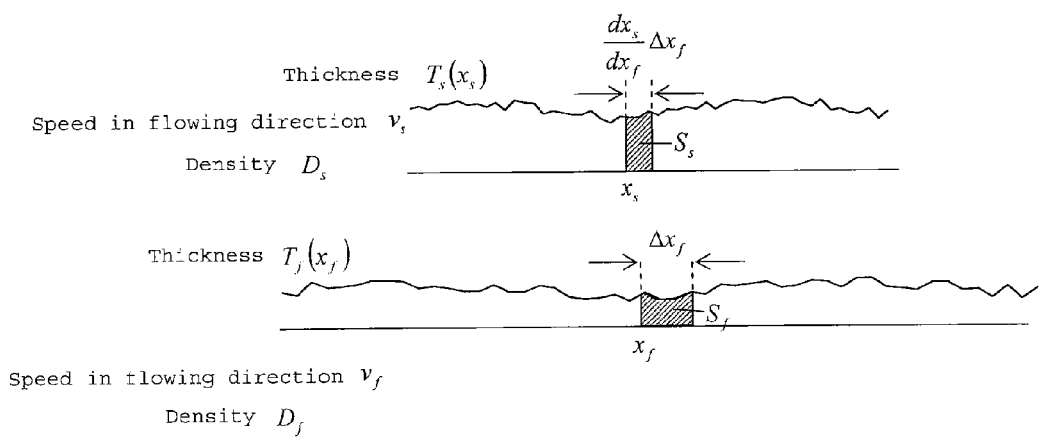
[Fig. 9]
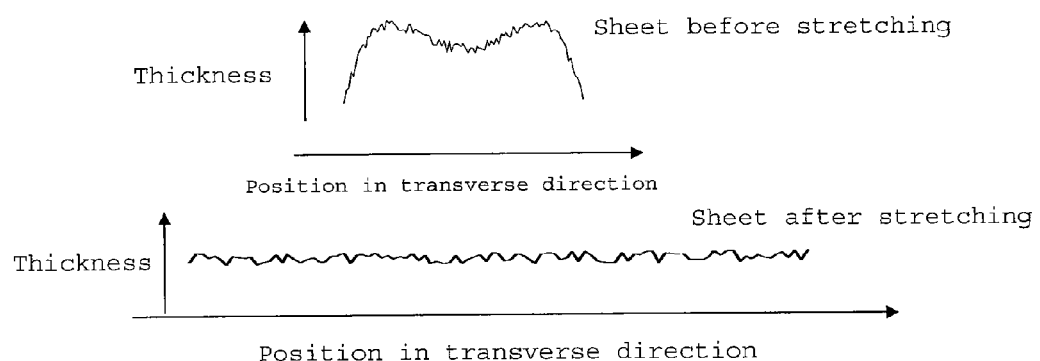

[Fig. 10]
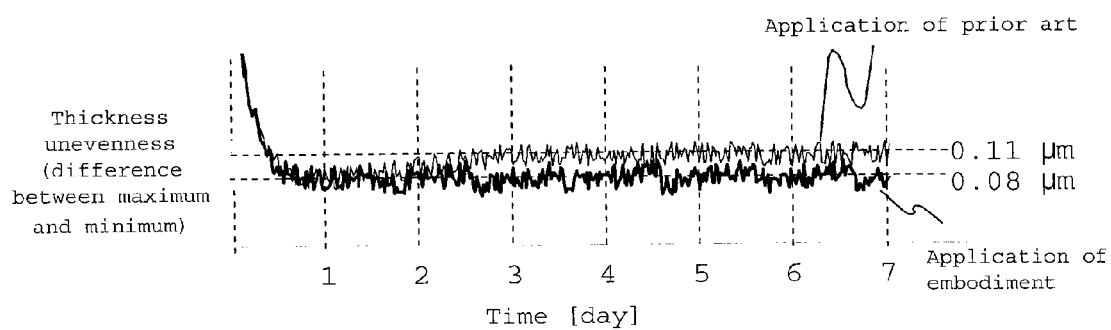

[Fig. 11]
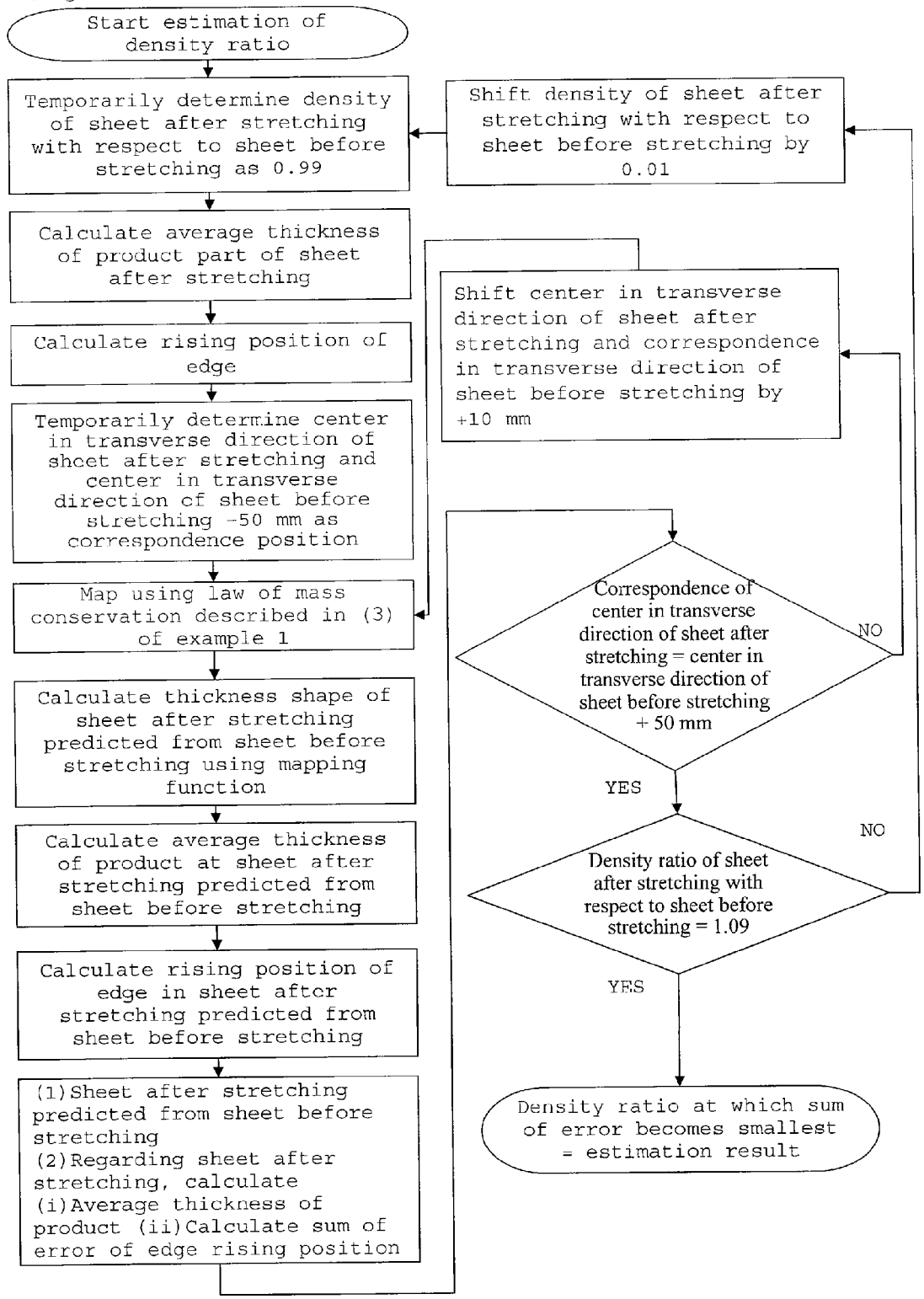

[Fig. 12]
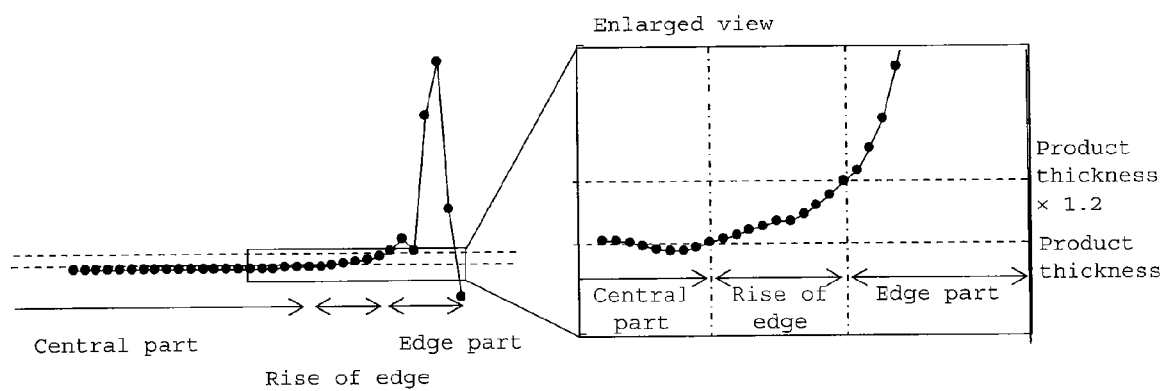

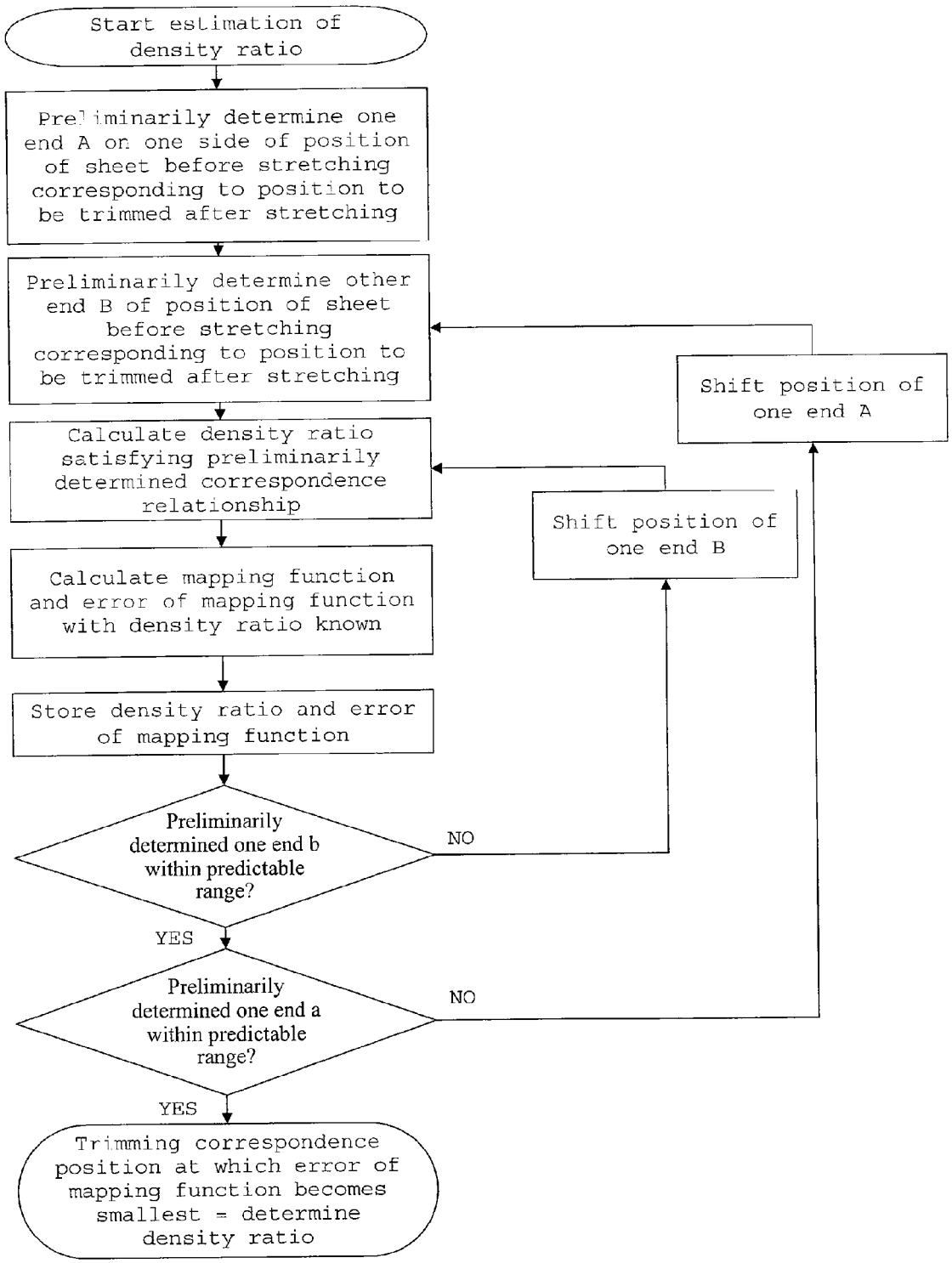
[Fig. 13]

SHEET MANUFACTURING METHOD AND SHEET MANUFACTURING DEVICE

This application is the U.S. National Phase Application of PCT International Application No. PCT/JP2006/323885, filed Nov. 30, 2006 (incorporated by reference herein in its entirety), and claims priority of Japanese Patent Application No. 2005-345354, filed Nov. 30, 2005.

TECHNICAL FIELD

The present invention relates to a sheet manufacturing method and a sheet manufacturing device of a film etc.

BACKGROUND ART

The background of the present invention will be described with reference to the drawings using an example of manufacturing a stretched film. FIG. 1 is a view showing an overall schematic configuration of a general sheet manufacturing facility, and FIG. 2 is an enlarged perspective view of the main parts of a die 4 shown in FIG. 1.

The sheet manufacturing facility of FIG. 1 (1) forms a sheet material such as polymer extruded by an extruding machine 3 to a sheet form by means of a die 4 in which a thickness adjusting means 10 of the sheet is arranged in plurals in the transverse direction of the sheet; (2) further performs processing such as stretching on the formed sheet 1 by means of a stretching machine 2; (3) measures the sheet thickness as a distribution in the transverse direction of the sheet by means of a post-processing thickness gauge 8 (the thickness distribution measurement value in the transverse direction of the measured sheet is hereinafter sometimes referred to as thickness profile); and (4) winds the sheet 1. In such sheet manufacturing facility, attempt is generally made to bring the measured thickness profile closer to the target thickness profile set in advance. Thus, the thickness measurement value at the thickness measuring position corresponding to the thickness adjusting means 10 of the sheet arranged in plurals in the transverse direction of the die 4 is brought closer to the target value set in advance. Each thickness adjusting means 10 is thus controlled through a computer 14, which calculates the manipulated variable to be applied to the thickness adjusting means 10 based on the thickness profile measured in the post-processing thickness gauge 8, and a control means 9 for applying the manipulated variable to the thickness adjusting means 10. FIG. 3 is a view describing a correspondence relationship between the thickness adjusting means 10 in the die 4 and the thickness adjusting means at the position of the post-processing thickness gauge 8. The upper horizontal line of FIG. 3 shows the sheet in the die 4, and the lower horizontal line shows the sheet in the post-processing thickness gauge 8. The polymer that has passed positions 21a to 21d of each thickness adjusting means 10 in the die 4 is subjected to processing such as stretching in the transverse direction of the sheet, and passes positions 22a to 22d in the transverse direction of the sheet at the thickness measuring position. Therefore, the thickness adjusting means 10 at 21a needs to be controlled so that the thickness measurement value at 22a becomes closer to the target value.

In such sheet manufacturing method, it is important that the correspondence relationship between each thickness adjusting means 10 and the sheet thickness measuring position is accurately determined. If not accurately determined, the sheet thickness at the position different from the position to be essentially adjusted changes, for example, the sheet thickness at 22b changes if the thickness adjusting means at 21b is operated to adjust the sheet thickness at 22a in FIG. 3, whereby the thickness of the sheet cannot be accurately controlled, and the quality of the sheet lowers.

The above problem mainly results from the fact that uniform dimensional change in the transverse direction of the sheet cannot be realized in processing involving dimensional change in the transverse direction of the sheet such as stretching, foaming, or the like. In manufacturing a sheet that is non-stretched and is merely formed to a sheet form by the die 4, the correspondence relationship between each thickness adjusting means and the sheet thickness measuring position excluding the ends in the transverse direction of the sheet having a neck-in when extruding the polymer can be more or less responded by a geometric position relationship. In performing stretching process on the sheet in the transverse direction, the stretching magnification in the transverse direction of the sheet is not uniform with respect to the position in the transverse direction of the sheet due to temperature unevenness etc. during the stretching process, and thus each thickness adjusting means and the sheet thickness measuring position after stretching cannot be in a correspondence relationship with merely the geometric position relationship.

Regarding such problems, methods of patent document 1 and patent document 2 have been proposed as a method of arranging a thickness gauge of the sheet before stretching (pre-processing thickness gauge), and obtaining the correspondence relationship from the thickness profile of the sheet before stretching and the thickness profile of the sheet after stretching measured by the post-processing thickness gauge. In both methods of patent document 1 and patent document 2, the fact that the correspondence position of each thickness adjusting means more or less can be geometrically obtained in the sheet before stretching is used. The method described in patent document 1 first measures the thickness profile of the sheet before stretching, divides the thickness profile of the sheet before stretching to a constant zone, and obtains a partial cross-correlation function between the divided profile of each part of the sheet before stretching and the thickness profile of the sheet after stretching to detect the correspondence relationship between the position in the transverse direction of the sheet in the thickness gauge of before stretching and the position in the transverse direction of the sheet in the thickness gauge of after stretching. The correspondence position of each thickness adjusting means in the sheet after stretching is detected from the correspondence position in the sheet before stretching of each thickness adjusting means obtained through geometric calculation and empirical method.

In the method described in patent document 2, a reference correspondence position having a pair of correspondence relationship of the sheet before stretching and the sheet after stretching is set. The correspondence of the position in the transverse direction of the sheet in the thickness gauge of before stretching and the position in the transverse direction of the sheet in the thickness gauge of after stretching is obtained such that the mass that passes per time from the reference correspondence position is the same between each region of the sheet before stretching and each corresponding region of the sheet after stretching. The correspondence position of each thickness adjusting means in the sheet after stretching is then detected from the correspondence position in the sheet before stretching of each thickness adjusting obtained through geometric calculation and empirical method.

Through the use of such methods, the correspondence relationship of the thickness adjusting means can be estimated without generating loss during sheet manufacturing a certain situation.

[Patent document 1] Japanese Laid-Open Patent Publication No. 63-315221

[Patent document 2] Japanese Laid-Open Patent Publication No. 9-164582

DISCLOSURE OF THE INVENTION

Problem to be Solved by the Invention

However, according to the knowledge of the inventors, the methods described in patent document 1 and patent document 2 have drawbacks in erroneous detection and detection leakage as described below.

First, in the method described in patent document 1, the correlation of the profiles enlarged or reduced in the transverse direction of the sheet is calculated instead of only the position in the transverse direction of the sheet when calculating the correlation of the thickness profile in the transverse direction in a predetermined zone of the sheet before stretching and the thickness profile in the transverse direction in a predetermined zone of the sheet after stretching. However, the enlargement and reduction is essentially restricted by the thickness of the sheet before stretching and the thickness of the sheet after stretching, longitudinal stretching magnification, and the density of the sheet before stretching and the sheet after stretching. Thus, in the method of patent document 1, the enlargement factor or the reduction factor having the highest profile correlation, and the enlargement factor or the reduction factor calculated from the sheet thickness might not be consistent since the search range in calculating the correlation is wide.

Furthermore, in the method described in patent document 1, the following problems arise when obtaining cross-correlation in the preset zone. In this method, a low frequency band-pass filter needs to be applied to remove thickness unevenness of the pitch that is large in the transverse direction within the zone to calculate the cross-correlation. Thus, since the low frequency band-pass filter is applied in the adjacent zones with the boundary of the preset zone in between, if the thickness profile has concavity and convexity at the boundary of the divided zone, the shape of such concavity and convexity sometimes greatly deform. There are cases where filter is used and is not used when calculating the correlation depending on the location where thickness unevenness occurred. A feature of thickness unevenness common in the thickness profile of the sheet before stretching and the sheet after stretching preferably exists in all the divided zones, but erroneous detection might occur if a feature does not exist.

In the method described in patent document 2, a feature of the shape of the profile is not used as opposed to patent document 1. This method instead uses the property that the sheet material of the same mass passes the corresponding site of the sheet before and after stretching. To this end, consideration is made on the thickness of the sheet before stretching, the thickness of the sheet after stretching, the longitudinal stretching magnification, the density of the sheet before stretching and the sheet after stretching, and the like. However, in the manner of thinking described in the relevant document, the correspondence is determined depending only on the mass that passes, and thus the correspondence relationship of at least one location between the sheet before stretching and the sheet after stretching needs to be known in advance. Thus, the correspondence position is calculated with the pair of reference correspondence positions given to the sheet before stretching and the sheet after stretching, respectively, as the starting point. Thus, large errors are not found compared to the method described in patent document 1, but an erroneous correspondence position is sometimes estimated as the reference correspondence position needs to be set in advance.

In the method described in patent document 2, the reference correspondence position may be at any location, and for example, the reference correspondence position may be at the center of the sheet before stretching and the sheet after stretching. In the latter case, the center of the sheet before stretching always needs to correspond to the center of the sheet after stretching. Actually, such correspondence relationship deviates if there is unevenness in the atmosphere temperature in the stretching process. There is also an empirical fact that the atmosphere temperature distribution in the stretching process does not always have the same distribution, but rather the temperature distribution changes with elapse of time. In the method described in patent document 2, a correct correspondence relationship cannot be obtained since the reference correspondence position is used in such variation. That is, in the method described in patent document 2, the correspondence relationship cannot be obtained based on an uncertain assumption that the positions of the respective centers of the sheet before stretching and the sheet after stretching correspond, and the success and failure of such assumption cannot be verified, and thus the correspondence relationship of a required accuracy cannot be obtained if the assumption is wrong.

In particular, the above problem is significant in a manufacturing device in which the sheet width is large or a manufacturing device in which the dimensional change in the transverse direction of the sheet is large that is easily susceptible to temperature distribution in time of processing such as stretching. In the manufacturing device of the stretched film, compared to the film manufacturing device that sequentially performs stretching of stretching the film in the running direction of and then stretching the same in the transverse direction, the above problems are significant in the case of the film manufacturing device of simultaneously performing stretching of the film in the running direction and in the transverse direction of the film as the crystallization degree when stretching in the transverse direction is small.

It is an object of the present invention to provide a sheet manufacturing method resolved with the conventional drawbacks described above, that is, a sheet manufacturing method capable of correctly estimating the correspondence relationship of after stretching of the thickness adjusting means without generating loss during sheet manufacturing and precisely adjusting the thickness, and a program, a computer, and a sheet manufacturing device.

Means for Solving the Problems

According to the present invention, there is provided a sheet manufacturing method including the steps (1) to (5):

(1) extruding a sheet material to a sheet form using a die including plural thickness adjusting means;

(2) forming a desired sheet by performing a predetermined processing involving dimensional change in a transverse direction of a sheet;

(3) measuring a thickness distribution in the transverse direction of the sheet before completion and after completion of the predetermined processing;

(4) calculating a manipulated variable to be applied to the thickness adjusting means corresponding to each measuring position based on the thickness distribution measurement value in the transverse direction of the sheet after completion of the processing; and (5) controlling the thickness of the sheet by operating the thickness adjusting means by the manipulated variable; wherein in the calculation of the manipulated variable of step (4), a correspondence position in the transverse direction of the sheet after completion of the processing with respect to the thickness adjusting means is determined through the following steps A and B, and a thickness control is performed based on the determined correspondence position in the transverse direction of the sheet, A. obtaining unknown parameters such that an evaluation function including a mapping function representing a correspondence relationship between a position in the transverse direction of the sheet before completion of the processing and a position in the transverse direction of after completion of the processing and including one or more unknown parameters, a thickness distribution measurement value in the transverse direction of the sheet before completion of the processing, and a thickness distribution measurement value of after completion of the processing becomes an extreme value, and B. determining the mapping function based on the obtained unknown parameters and determining the corresponding position in the transverse direction of the sheet after completion of the processing with respect to the thickness adjusting means based on the determined mapping function.

According to a preferred mode of the present invention, the sheet manufacturing method is provided where the evaluation function uses that which corresponds to a total of a difference between a mass of the sheet material passing per unit time each part in the transverse direction of the sheet before completion of the processing and a mass of the sheet passing per unit time each part in the transverse direction of the sheet after completion of the processing.

According to a preferred mode of the present invention, the sheet manufacturing method is provided, where the unknown parameters is determined to minimize or maximize the evaluation function using equation <1> or an equation mathematically equivalent thereto for the evaluation function, Equation 1

$$E(\theta) = \int_{x_{f0}}^{x_{f1}} \left\| T_f(x_f) v_f D_f - T_s(g(x_f, \theta)) \frac{dg(x_f, \theta)}{dx_f} v_s D_s \right\|^2 dx_f \quad <1>$$

where

E: evaluation function representing an error of the mapping function xf: position in the transverse direction of the sheet after completion of the processing Tf(xf): sheet thickness at position xf in the transverse direction of the sheet after completion of the processing xs: position in the transverse direction of the sheet before completion of the processing Ts(xs): sheet thickness at position xs in the transverse direction of the sheet before completion of the processing θ: parameter vector in which the number of elements contained in the mapping function g(xf, θ) is greater than or equal to one g(xf, θ): mapping function, mathematical formula modeling the position xs in the transverse direction of the sheet before completion of the processing with parameter θ as a function of the position xf in the transverse direction of the sheet after completion of the processing vf: speed in sheet running direction of after completion of the processing vs: speed in sheet running direction of before completion of the processing Df: sheet density after completion of the processing Ds: sheet density before completion of the processing xf0: position in the transverse direction of the sheet after completion of the processing that becomes a starting point when calculating the error of the mapping function xf1: position in the transverse direction of the sheet after completion of the processing that becomes a terminating point when calculating the error of the mapping function.

According to a preferred mode of the present invention, the sheet manufacturing method is provided where prior to step A of step (4), the unknown parameters is preliminarily obtained so that a preliminary evaluation function of the mapping becomes an extreme value, the preliminary evaluation function including a thickness distribution measurement value in the transverse direction of the sheet before completion of the processing, a thickness distribution measurement value of after completion of the processing, and that corresponding to a density of the sheet material of each part in the transverse direction of the sheet before completion of the processing and/or density of after completion of the processing or a ratio thereof as unknown parameters, and the unknown parameters corresponding to the density of the sheet material of each part in the transverse direction of the sheet before completion of the processing and/or the density of after completion of the processing or the ratio thereof of the preliminarily obtained unknown parameters is determined; and in A of step (4), the mapping function is determined with the determined unknown parameters corresponding to the density of the sheet material of each part in the transverse direction of the sheet before completion of the processing and/or the density of after completion of the processing or the ratio thereof as known parameters.

According to a preferred mode of the present invention, the sheet manufacturing method is provided where the evaluation function includes the density of the sheet material of each part in the transverse direction of the sheet before completion of the processing and/or the density of after completion of the processing or the ratio thereof as unknown parameters.

According to a preferred mode of the present invention, the sheet manufacturing method is provided where only a region included at a central part is used as a region in the transverse direction of the sheet for obtaining the sum of the errors in the evaluation function.

According to a preferred mode of the present invention, the sheet manufacturing method is provided where a region substantially included at both ends of the sheet is used as a region in the transverse direction of the sheet for obtaining the sum of the errors in the evaluation function.

According to a preferred mode of the present invention, the sheet manufacturing method is provided where a central part and a region included in a rising part of a sheet edge positioned at both ends of the central part are used as a region in the transverse direction of the sheet for obtaining the sum of the errors in the evaluation function.

According to a preferred mode of the present invention, the sheet manufacturing method is provided where the unknown parameters is determined to minimize or maximize the evalu ation function using equation <2> or an equation mathematically equivalent thereto for the evaluation function, Equation 2

$$E(\theta) \int_{x_{f_0}}^{x_{f_1}} \left\| T_f(x_f) v_f - T_s(g(x_f, \theta)) \frac{dg(x_f, \theta)}{dx_f} v_s h(\theta) \right\|^2 dx_f \quad <2>$$

where

E: evaluation function representing an error of the mapping function xf: position in the transverse direction of the sheet after completion of the processing Tf(xf): sheet thickness at position xf in the transverse direction of the sheet after completion of the processing xs: position in the transverse direction of the sheet before completion of the process Ts(xs): sheet thickness at position xs in the transverse direction of the sheet before completion of the processing θ: parameter vector in which the number of elements contained in the mapping function g(xf, θ) is greater than or equal to one g(xf, θ): mapping function, function representing the position xs in the transverse direction of the sheet before completion of the processing with the position xf in the transverse direction of the sheet after completion of processing and parameter θ h(xf, θ): function configured by the position xf in the transverse direction of the sheet after completion of processing and parameter θ in the evaluation function vf: speed in sheet running direction of after completion of the processing vs: speed in sheet running direction of before completion of the processing xf0: position in the transverse direction of the sheet after completion of the processing that becomes a starting point when calculating the error of the mapping function xf1: position in the transverse direction of the sheet after completion of the processing that becomes a terminating point when calculating the error of the mapping function.

According to a preferred mode of the present invention, the sheet manufacturing method is provided where g(xf,θ) is a polynomial equation related to xf, and a coefficient of each term of the polynomial equation is each element of the parameter vector θ in the evaluation function.

According to a preferred mode of the present invention, the sheet manufacturing method is provided where a value including a temporal weighted means and performed with averaging process is used as the thickness distribution measurement value.

According to another mode of the present invention, there is provided a program including the steps (1) to (5):

(1) extruding a sheet material to a sheet form using a die including plural thickness adjusting means;

(2) forming a desired sheet by performing a predetermined processing involving dimensional change in a transverse direction of a sheet;

(3) measuring a thickness distribution in the transverse direction of the sheet before completion and after completion of the predetermined processing;

(4) calculating a manipulated variable to be applied to the thickness adjusting means corresponding to each measuring position based on a thickness distribution measurement value in the transverse direction of the sheet after completion of the processing; and (5) controlling the thickness of the sheet by operating the thickness adjusting means by the manipulated variable; wherein in the calculation of the manipulated variable of step (4), a correspondence position in the transverse direction of the sheet after completion of the processing with respect to the thickness adjusting means is determined through the program of the following steps A and B, and a thickness control is performed based on the determined correspondence position in the transverse direction of the sheet using a computer, A. obtaining unknown parameters such that an evaluation function including a mapping function representing a correspondence relationship between a position in the transverse direction of the sheet before completion of the processing and a position in the transverse direction of after completion of the processing and including one or more unknown parameters, a thickness distribution measurement value in the transverse direction of the sheet before completion of the processing, and a thickness distribution measurement value of after completion of the processing becomes an extreme value, and B. determining the mapping function based on the obtained unknown parameters and determining the corresponding position in the transverse direction of the sheet after completion of the processing with respect to the thickness adjusting means based on the determined mapping function.

According to another embodiment, there is provided a computer readable recording medium recorded with the program.

According to another embodiment, there is provided a computer including the program.

According to another embodiment, there is provided a sheet manufacturing device including means (1) to (6):

(1) die including plural thickness adjusting means for extruding a sheet material to a sheet form;

(2) processing device for performing a predetermined processing including stretching or foaming on the sheet shaped object;

(3) pre-processing thickness gauge for measuring a thickness distribution in the transverse direction of the sheet before completion of the processing;

(4) post-processing thickness gauge for measuring a thickness distribution in the transverse direction of the sheet after completion of the processing;

(5) computer for calculating a manipulated variable to be applied to the thickness adjusting means corresponding to each measuring position based on a measurement value of the post-processing thickness gauge; and (6) control device for adding the manipulated variable calculated by the computer to the thickness adjusting means; wherein in the calculation of the manipulated variable, the computer of (5) determines a correspondence position in the transverse direction of the sheet after completion of the processing with respect to the thickness adjusting means through a method of the following steps A and B, and performs a thickness control based on the determined correspondence position in the transverse direction of the sheet, A. obtaining unknown parameters such that an evaluation function including a mapping function representing a correspondence relationship between a position in the transverse direction of the sheet before completion of the processing and a position in the transverse direction of after completion of the processing and including one or more unknown parameters, a thickness distribution measurement value in the transverse direction of the sheet before completion of the processing, and a thickness distribution measurement value of after completion of the processing becomes an extreme value, and B. determining the mapping function based on the obtained unknown parameters and determining the corresponding position in the transverse direction of the sheet after completion of the processing with respect to the thickness adjusting means based on the determined mapping function.

The present invention is configured as above, where the correspondence relationship in the transverse direction of the sheet is obtained from the thickness profile of the sheet before stretching and the thickness profile of the sheet after stretching, and the position in the transverse direction of the sheet after stretching of each thickness adjusting means is obtained as a result.

In the present invention, "thickness adjusting means" refers to a means, arranged in correspondence to each part in the transverse direction of the sheet, for adjusting the discharge amount of the sheet material at each part. A die bolt (in particular, the type which controls the length of the die bolt by thermal expansion is referred to as heat bolt) in a die of a method of changing the discharge amount of the sheet material by mechanically, thermally, or electrically changing the clearance of the die, a lip heater in a die of a heater method of changing the discharge amount by changing the heater generating heat to change the viscosity of the sheet material of the relevant location and change the flow rate; and the like are used. In the manufacturing process of a biaxial stretched polyethylene telephtalate film, the bolt method is preferably used since the adjustable discharge range is relatively large.

In the present invention, "sheet material" refers to the raw material constituting the sheet. Materials such as pulp slurry of a paper, plastic to be melted or dissolved, and the like are used. An arbitrary material such as polypropylene, polyethylene telephtalate or polyethylene naphthalate, pulp or paper making material, and the like are considered. Such materials are often transformed to a fluid state to be discharged from the die by heating the material, dissolving the resin with organic solvent, and forming the material into a slurry form with water. Thus, the sheet material may contain water or organic solvent during the manufacturing process of the sheet.

In the present invention, "manipulated variable" refers to an energy amount or a numerical value corresponding thereto to be applied to each thickness adjusting means to change the discharge amount of the sheet material at the thickness adjusting means. For instance, when using a heater etc., the manipulated variable is the power amount input through a power unit. In the heat bolt method of thermally extending or contracting the bolt, power is supplied to the heater annexed to the bolt thereby heating the bolt, and the bolt accordingly extends or contacts, and the width of the clearance is adjusted. In other methods as well, power is normally supplied to operate the thickness adjusting means.

In the present invention, "predetermined processing" refers to a processing in which the flow of sheet material has components also in the transverse direction of the sheet in an arbitrary processing process in manufacturing of the sheet, and a typical example corresponds to the stretching process or the foaming process in the transverse direction and/or the running direction.

In the present invention, "before completion of the predetermined processing" refers to a state in which each thickness adjusting means and the correspondence position in the transverse direction of the sheet can be estimated from a geometric relationship since the sheet material discharged from the die does not contain movement component in the transverse direction of the sheet at the position in the transverse direction of the sheet to be controlled in at least the thickness adjusting means or the magnitude of the flow in the transverse direction of the sheet is relatively sufficiently small. Since the contraction amount is normally small even when a neck-in phenomenon in which the sheet material slightly contracts in the transverse direction when being discharged from the die occurs, each thickness adjusting means and the correspondence position in the transverse direction of the sheet of after neck-in can be geometrically obtained in a relatively easy manner. If the above described "predetermined processing" is performed, the deformation in the transverse direction of the sheet is large, and the deformation by the location in the transverse direction is not even, and thus a correct correspondence relationship may not be obtained with the estimation based on such geometric relationship.

In the present invention, "after completion of the predetermined processing" refers to a state after the processing process in which the movement of the sheet material contains component in the transverse direction of the sheet is completed in the manufacturing of the sheet.

In the present invention, "mapping function" is a function obtained by modeling a relationship between the position in the transverse direction of the sheet of the sheet after the predetermined processing and the position in the transverse direction of the sheet of the sheet before the predetermined processing with a mathematical formula. The mapping function may be a polynomial equation of greater than or equal to a first order, various functions encompassed within the range of the trigonometric function, exponential function, or may be an arbitrary function such as the sum of the listed functions. Here, the configuration of the function will be determined in advance with respect to the mapping function, but each coefficient such as the coefficient of the polynomial equation, the angular frequency of the trigonometric function, and the base portion of the exponential function is unknown parameters when estimating the correspondence position. For instance, the mapping function $g(x_f, \theta)$ is expressed with the following equation <3>.

Equation 3

$$x_s = g(x_f, \theta) \qquad <3>$$

where, xf: position in the transverse direction of the sheet after completion of the processing xs: position in the transverse direction of the sheet before completion of the processing $\theta$: parameter vector in which the number of elements is greater than or equal to one If modeled using the polynomial equation, the function is expressed with the following equation <4>.

Equation 4

$$x_s = \sum_{i=0}^{I} (\theta_i x_f^i) \qquad <4>$$

where, xf: position in the transverse direction of the sheet after completion of the processing xs: position in the transverse direction of the sheet before completion of the processing I: order of the modeled polynomial equation i: integer of greater than or equal to 0 and less than or equal to I θi: coefficient of $i^{th}$ order of the modeled polynomial Equation.

Consider a case of modeling with a first-order polynomial equation by way of example. In this case, the relationship between the position in the transverse direction of the sheet before stretching and the position in the transverse direction of the sheet after stretching is approximated with a linear expression. The stretching magnification in the transverse direction of the sheet corresponding to a first-order differentiation of the polynomial equation at the position in the transverse direction of the sheet after stretching becomes zero order, and is unknown but is constant. Similarly, the secondary term of when approximated with the second-order polynomial equation becomes a model where the first-order differentiation leads to first-order, and the lateral stretching magnification in the transverse direction of the sheet linearly changes.

In the present invention, "evaluation function" is a function for evaluating the error of the mapping function. As described above, the structure of the function is determined with respect to the mapping function, but the coefficients are unknown parameters. Specifically, the evaluation function is a function related to the unknown parameters that is normally represented to express the extent the mass or the volume running per time at a correspondence position of before completion of the processing and of after completion of the processing of the sheet match in a predetermined region in the transverse direction of the sheet. Furthermore, the value of the evaluation function may be set large when the error of the mapping function is small, or the value of the evaluation function may be set small when the error of the mapping function is large.

In the present invention, "extreme value" is the value of the evaluation function in which the evaluation function locally minimizes or maximizes in the vicinity of the value of a set of certain unknown parameters when obtaining the unknown parameters so as to reduce the error of the mapping function using the evaluation function.

In the present invention, regarding "mathematically equivalent", a case where the evaluation function differs by constant multiples in the above evaluation function or each evaluation function in which the result of obtaining the unknown parameters such that the evaluation function becomes an extreme value barely changes even when the evaluation function is slightly changed are referred to as being mathematically equivalent. It should be noted that being subjected to various conversions involved in handling the physical amount, which is originally a continuous amount, in a dispersed manner to be easily used in a calculator is also considered mathematically equivalent.

In one preferred embodiment of the present invention, the mapping function may be determined such that the mass running per time at a correspondence position of before completion of the processing and of after completion of the processing of the sheet match in a predetermined corresponding region in the transverse direction of the sheet. In the present invention, "parameters corresponding to density" refers to the density of before completion of processing and of after completion of processing when accurate measurement is difficult, and a correction coefficient for calculating the mass of the true sheet material from the volume of the sheet material running per time obtained from the measurement result as a correction coefficient for correcting the error of the absolute value of the measurement thickness due to incompleteness of calibration of the thickness gauge for before completion of the processing and the thickness gauge for after completion of the processing. In this case as well, the value does not necessarily need to be a value close to the actual density if mathematically equivalent in terms of evaluation function.

It may be a ratio of the density of the sheet material before processing and the density of the after processing.

In the present invention, "central part" refers to a region having a width of 80% with respect to the entire width of the sheet with the center of the sheet as the center at a position in the transverse direction of the sheet before processing or after processing in a manufacturing facility of the sheet including a predetermined processing process such as stretching or foaming process.

Furthermore, in the present invention, "rise of sheet edge" refers to a location where the thickness gradually becomes thicker towards the edges from the center in the transverse direction of the sheet near the sheet edge thicker than the central part on the outer side of the central part. It is obtained by evaluating in the sheet after processing, and using the fact the mass that flows per time at a correspondence position of before completion of processing and after completion of processing is the same at the corresponding position in the sheet before processing.

An example where the rising region of the sheet is a region having a thickness of smaller than or equal to 1.2 times the average thickness of the central part is shown in FIG. 12. In the enlarged view shown on the right side of FIG. 12, it is the region of 80% the center in the transverse direction of the sheet, the thickness is normally near the average thickness in the central part of the sheet, the location where the thickness of the sheet exceeds a specific threshold times (1.2 times in the present example) the average thickness is the sheet edge, and the region sandwiched by the central part and the sheet edge is the rise of the sheet edge. Here, the average thickness is calculated by averaging the thickness profile at the central part of the sheet when measuring the thickness distribution in the thickness gauge in the transverse direction of the sheet. The average thickness may be sequentially updated for every measurement by the thickness gauge or may take a constant value (e.g., average value up to a relevant point) for a predetermined period.

EFFECTS OF THE INVENTION

According to the present invention, the correspondence relationship between the thickness adjusting means and the thickness measuring position can be accurately estimated without producing a great loss during manufacturing of the product as described below. Therefore, when manufacturing a sheet, the thickness adjustment can be accurately performed using the determined correspondence relationship, whereby the yield enhances and the productivity enhances.

BRIEF DESCRIPTION OF THE DRAWINGS

FIG. 1 is a schematic explanatory view of a conventional film manufacturing process;

FIG. 2 is an enlarged perspective view of the main parts of a die shown in FIG. 1;

FIG. 3 is a view showing a relationship between a position of a thickness adjusting means in the die and a correspondence position in the thickness gauge of after stretching;

FIG. 4 is a schematic explanatory view of a film manufacturing process according to one embodiment of the present invention;

FIG. 5 is an example of a weight on each measurement value for performing temporal weighted averaging process used to smooth the measured thickness profile according to one embodiment of the present invention;

FIG. 6 is a view showing a flow of calculation in one embodiment of the present invention;

FIG. 7 is a view showing a relationship of a position of the thickness adjusting means in the die, a correspondence position at the thickness gauge of before stretching, and a correspondence position at the thickness gauge of after stretching;

FIG. 8 is a schematic explanatory view according to one embodiment of the present invention;

FIG. 9 is a view showing a thickness profile of the sheet before stretching and the sheet after stretching shown in FIG. 4;

FIG. 10 is a view showing transition of thickness unevenness when one embodiment of the present invention is applied in sheet manufacturing and transition of thickness unevenness when the prior art is applied in sheet manufacturing;

FIG. 11 is a view of another embodiment of the present invention, showing a flowchart of an algorithm for estimating the density ratio of before and after stretching of the sheet;

FIG. 12 is a view explaining the rising portion of the sheet edge used in one embodiment of the present invention; and FIG. 13 is a view of one embodiment of the present invention, showing a flowchart of an algorithm for estimating a density ratio of before and after stretching from the thickness profile of the sheet after stretching which sheet edge is trimmed.

DESCRIPTION OF SYMBOLS

1: sheet (film)
2: stretching machine
3: extruding machine
4: die
5: cooling roll
6: winder
7: conveyance roll
8: thickness gauge
9: control means
10: thickness adjusting means
11: clearance
20a, 20b, 20c, 20d: correspondence position of the thickness adjusting means at the thickness measuring position before stretching
21a, 21b, 21c, 21d: correspondence position of the thickness adjusting means in the die
22a, 22b, 22c, 22d: correspondence position of the thickness adjusting means at the thickness measuring position after stretching

BEST MODE FOR CARRYING OUT THE INVENTION

An example of an embodiment of the present invention will now be described with reference to the drawings using a case of being applied to the process of manufacturing a plastic film including stretch processing with the polymer such as polyethylene telephtalate used as the sheet material and formed to a sheet by way of example.

FIG. 4 is a view showing an overall schematic configuration of an equipment in which a thickness gauge for the sheet before stretching is added to the general sheet manufacturing facility shown in FIG. 1, and FIG. 2 is an enlarged perspective view of the main parts of die 4.

The sheet manufacturing facility includes an extruding machine 3 for extruding polymer, a die 4 for shaping the extruded polymer to a sheet form, a cooling roller 5 for cooling the polymer (hereinafter referred to as sheet 1) formed to a sheet form, a stretching machine 2 for stretching the sheet 1 at least in the transverse direction of the sheet, and a winder 6 for winding the stretched sheet 1. The die 4 includes a great number of adjusting means 10 arrayed in the transverse direction (direction perpendicular to the plane of drawing of FIG. 4) of the sheet 1 and a clearance 11 for discharging the polymer. Furthermore, the sheet manufacturing facility includes a post-stretching thickness gauge 8 for measuring the thickness distribution of the sheet after stretching in the transverse direction of the sheet, a computer 14 for calculation the manipulated variable to be applied to the thickness adjusting means based on the thickness distribution, and a control means 9 for applying the manipulated variable to the thickness adjusting means and updating the manipulated variable to be applied to the thickness adjusting means every time the manipulated variable is calculated by the computer 14. Apart from the post-stretching thickness gauge 8 of the sheet after stretching, a pre-stretching thickness gauge 12 for measuring the thickness distribution in the transverse direction of the sheet before stretching is arranged.

The post-stretching thickness gauge 8 and the pre-stretching thickness gauge 12 generally measure the thickness distribution in the transverse direction of the sheet by scanning the thickness of the sheet 1 in the transverse direction of the sheet, where that which optically scans in the transverse direction of the sheet instead of the mechanical scan, or that which has a great number of small thickness gauges lined in the transverse direction of the sheet may be used. An arbitrary thickness gauge may be used for the thickness gauge 8 and the thickness gauge 12 including those which use absorption of β-ray, X-ray, infrared ray, and the like, those which uses interference of visible light, infrared light, and the like. In the present embodiment, since the correspondence relationship of the position in the transverse direction of the sheet before stretching and the sheet after stretching is obtained based on mass and volume, the absolute value of the thickness profile of the sheet before stretching or the absolute value of the thickness profile of the sheet after stretching, and the density of the sheet before stretching and the sheet after stretching become important. Thus, calibration of the thickness gauge is desirably performed to obtain a correct absolute value of the thickness profile.

The control means 9 calculates the manipulated variable based on the difference value between the thickness measurement value of the sheet 1 and the target thickness value, and applies the manipulated variable to the thickness adjusting means 10.

The thickness adjusting means 10 is arranged in plurals in the die 4 at equal interval in the transverse direction of the sheet. As a specific configuration, a heat bolt type in which a heat bolt is used for the thickness adjusting means 10 and the temperature of such bolts is changed to thermally expand or contract the bolt and adjust the clearance 11 of the die 4, or a lip heater type in which a lip heater is used for the thickness adjusting means 10 and the thickness of the sheet 1 is adjusted by changing the temperature of the polymer and changing the discharge amount of the polymer to be discharged from the die 4 by change in viscosity coefficient of the polymer may be adopted. The thickness distribution in the transverse direction of the sheet can be adjusted in the thickness adjusting means 10, and the thickness average value of the entire width of the sheet can be adjusted by output of the extruding machine 3, and the like. The thickness adjusting means 10 may not be given a role to adjust the thickness average value of the entire width of the sheet. Using this fact, it is preferable to obtain the average value in the transverse direction of the sheet of deviation data with respect to deviation data of the difference between the thickness measurement value and the target thickness and subtract the average value in the transverse direction of the sheet from the deviation data when the control means 9 calculates the manipulated variable.

When the control means 9 calculates the manipulated variable, conversion process such as filtering process is preferably performed on the deviation data or difference between the thickness measurement value of the sheet 1 and the target thickness value. The filtering process includes filtering process in the transverse direction of the sheet for performing moving average process in the transverse direction of the sheet, filtering process in the time direction including temporal weighted mean with the past deviation data, and the like. As for the weighted averaging process, a lateral stretching magnification (lateral deformation magnification in arbitrary processing) includes the following averaging process. Assuming the weight on the most recent measurement value is a, the weight on the past measurement value in the temporal weighted averaging process having an exponential shape when a=0.1 is shown in FIG. 5. It is apparent that the weight sequentially becomes smaller by 0.9 times from the weight on the most recent measurement value. Through such filtering process, the influence of thickness unevenness in the running direction superimposed on the thickness measurement value can be reduced.

The following mathematical expression is obtained where current time is 0, filter output of the current time is y(0), measurement value of the current time is x(0), N is a natural number greater than or equal to one, and the measurement value at a time N steps before is x(−N).

$$y(0)=ax(0)+a(1-a)x(-1)+a(1-a)^2 x(-2)+ \ldots +a(1-a)^N x(-N)+ \ldots$$

Furthermore, the control means 9 calculates the manipulated variable based on the deviation data decimated to the number of thickness adjusting means with respect to the filtering processed deviation data having elements of the number of thickness measuring points in the transverse direction, and controls the thickness adjusting means 10. A method of creating deviation data having elements of the number of thickness adjusting means from the deviation data having elements of the number of thickness measuring points appropriately uses a method of using the deviation data at the thickness measuring point of the position corresponding to each thickness adjusting means, a method of using a value obtained by averaging the deviation data at the thickness measuring points of a constant range from the position corresponding to each thickness adjusting means, or the like. The control method may be a PID control or a modern control using mathematical model. Here, a method of considering the fact that change in thickness influences each other in the transverse direction as a result of the operation of each thickness adjusting means is also a satisfactory method for the mathematical model. When using the PID control or the modern control, an operation of equalizing the manipulated variable to be applied to each thickness adjusting means in the transverse direction to prevent the difference in the manipulated variable to be applied to the thickness adjusting means from becoming large between the adjacent thickness adjusting means may be used.

In the sheet manufacturing facility described above, the correspondence relationship between each thickness adjusting means and each thickness measuring position is more or less known, where the correspondence relationship is constantly and accurately estimated, and the thickness is desirably controlled using such correspondence relationship in order to accurately control the thickness of the sheet.

A method of estimating on a steady basis the correspondence position in the transverse direction of the sheet of the sheet after stretching with respect to each thickness adjusting means of the sheet in the present embodiment will be described below based on the flowchart of FIG. 6. Here, the term "estimate on a steady basis" refers to estimating the correspondence relationship of the thickness adjusting means every time the thickness gauge before completion of stretching and the thickness gauge after completion of stretching measure the thickness distribution in the transverse direction of the sheet during sheet manufacturing (on-line method). The correspondence relationship of the thickness adjusting means may be estimated only when the thickness unevenness of the thickness profile after stretching is large, or the correspondence relationship of the thickness adjusting means may be intermittently estimated. Furthermore, instead of performing estimation on a steady basis, a test run for estimating the correspondence relationship may be performed before sheet manufacturing to estimate the correspondence relationship, and manufacturing of the sheet may then be started based on the result thereof (off-line method).

First, the shape of the function of the mapping function in which the relationship between the position in the transverse direction of the sheet of the sheet after stretching and the position in the transverse direction of the sheet of the sheet before stretching is modeled with a mathematical formula is determined. As described above, the mapping function may be a polynomial equation of greater than or equal to a first order, various functions encompassed within the range of the trigonometric function, exponential function, or may be an arbitrary function such as the sum of the listed functions.

The mapping function represents change in position in the transverse direction of the sheet involving a predetermined processing including stretching and foaming, where the mapping function is a smooth function, that is, the mapping function may be first-order differentiated with respect to the position due to the experimental fact that the position relationship smoothly changes in the above mentioned processing.

In order to determine the mapping function, the thickness profiles of the sheet before stretching and the sheet after stretching while forming the product are compared, and after reviewing with which function the stretching magnification in the transverse direction can be modeled, a function obtained by performing one-order integration on the relevant function with respect to the position in the transverse direction may be adopted as the mapping function. For instance, a method of modeling the mapping function from a phenomenon of a predetermined processing such as the temperature at the central part is high between the central part and the end portion in the transverse direction of the sheet may be used.

If the mapping function is modeled with a polynomial equation, the majority can be modeled with the first-order term. Actually, the mapping function is desirably approximated with the polynomial equation of greater than or equal to fifth order since higher precision is normally desired. A lateral stretching magnification is obtained by first-order differentiating the mapping function at the position in the transverse direction of the sheet. The model can more easily describe the true relationship as the number of elements of the parameters corresponding to the coefficient of each term increases, but variation in the estimated parameters tends to increase as the amount of parameters estimated from the same information amount increases.

If the order of the mapping function is increased, the following problems arise in addition to the increase in variation in the estimated parameters. In the manufacturing of the plastic film, which is a suitable application of the present invention, the thickness unevenness of fine pitch in the sheet before stretching remains as the thickness unevenness of fine pitch in the sheet after stretching, and the fine thickness unevenness is less likely to occur in the stretching process. Thus, the lateral stretching magnification smoothly changes at each part in the transverse direction of the sheet, and is often satisfactorily approximated with the polynomial equation of first to ninth order with respect to the position in the transverse direction of the sheet. Therefore, in the present embodiment, the mapping function is determined using an algorithm such that the approximate stretching magnification is obtained from the relationship of the mass, and accurate fitting uses the thickness unevenness of fine pitch. If the order is matched with the number of thickness measuring points in the sheet after stretching or the sheet before stretching, the present calculation becomes a failure setting problem, and the solution cannot be uniquely determined.

Modeling can be performed with a trigonometric function such as Fourier transformation other than approximating with the polynomial equation. Here, since the calculation of obtaining the extreme value of the evaluation function is facilitated if the differential related to the position in the transverse direction of the sheet can be analytically calculated, a function including first-order differential can be used for modeling.

To obtain the correspondence relationship in the transverse direction of the modeled sheet before stretching and the sheet after stretching, an evaluation function having unknown parameters representing the extent the mass that flows per time at the correspondence position of before stretching and after stretching matches in a predetermined region in the transverse direction of the sheet as a variable is set. First, mass conservation relationship at the sheet after stretching and the sheet before stretching is formulated. A frame format view in formulation is shown in FIG. 8.

As shown in the lower view of FIG. 8, the mass that passes per unit time at a microscopic region Sf of width Δxf at the position xf in the transverse direction of the sheet after stretching is expressed as equation <5>.

Equation 5

$$T_f(x_f)v_fD_f\Delta x_f \qquad <5>$$

where, xf: position in the transverse direction of the sheet after completion of stretching Δxf: microscopic width in the transverse direction of the sheet after completion of stretching Tf(xf): sheet thickness at position xf in the transverse direction of the sheet after completion of stretching vf: speed in sheet running direction of after completion of stretching Df: sheet density after completion of stretching The mass that passes per unit time at the microscopic region Ss of the sheet before stretching corresponding to the microscopic region Sf of the sheet after stretching is obtained. If modeled so that the position xs in the transverse direction of the sheet before completion of stretching corresponds to the position xf in the transverse direction of the sheet after completion of stretching, the width of the microscopic region Ss can be expressed as (dxs/dxf)×Δxf, whereby the mass corresponding to the microscopic region Ss of the sheet before stretching can be expressed with the following equation <6> as shown in the upper view of FIG. 8.

Equation 6

$$T_s(x_s)v_sD_s\frac{dx_s}{dx_f}\Delta x_f \qquad <6>$$

where, xs: position in the transverse direction of the sheet before completion of stretching Δxf: microscopic width in the transverse direction of the sheet after completion of stretching (dxs/dxf)×Δxf: microscopic width in the transverse direction of the sheet before completion of stretching corresponding to the microscopic width in the transverse direction of the sheet after completion of stretching Ts(xs): sheet thickness at position xs in the transverse direction of the sheet before completion of stretching vs: speed in sheet running direction of before completion of stretching Ds: sheet density before completion of stretching If the correspondence relationship is correct, the mass that passes per unit time through the corresponding microscopic region is equal, and the evaluation function can be defined such that the sum of the difference between them becomes a minimum.

The change in density is sometimes small or smaller than or equal to 1% even if stretching or foam stretching is performed. In this case, the evaluation function is determined using, not the mass conservation relational expression, but the volume conservation relational expression, that is, relational expression not including the term of density.

The region for obtaining the sum of the errors may be only the central part excluding the sheet edge etc., or may be the entire width including the sheet edge.

Here, sheet edge is the end in the transverse direction of the sheet in the sheet before stretching and the sheet after stretching, and often has the thickness greatly differed from the central part of the sheet due to great influence of neck-in and as the sheet is sometimes gripped in the stretching process. However, when including the sheet edge, experimental detection etc. is sometimes necessary as the correspondence relationship of each thickness adjusting means in the sheet before stretching is not geometrically defined due to influence of neck-in.

Furthermore, a region sandwiched by the rising location of the thickness of the sheet edge at where the film becomes thicker towards the sheet edge when the region is widened from the central part to the sheet edge may be used as the region for obtaining the sum of the errors. For instance, the region may be enlarged from the region of the central part in either direction in the transverse direction, and the region enlarged to the position in the transverse direction that becomes a predetermined thickness of greater than or equal to 1.05 times and smaller than or equal to 2.0 times the thickness of the central part after stretching may be used. As described above, the location at where the thickness shape relatively greatly changes at both ends in the transverse direction of the sheet is included in the evaluation, and the estimation accuracy enhances by using the rise of the sheet edge to be evaluated in the sheet after processing. If the rising edge of the sheet edge which thickness reaches greater than or equal to two times the thickness of the central part is set, the modification in the transverse direction in processing such as stretching tends to greatly differ from the central part, and thus the mapping function that particularly takes into consideration the modified shape of the edge needs to be used, and the region sandwiched by the rising location of the thickness of the sheet edge that normally becomes a predetermined thickness of greater than or equal to 1.05 times and smaller than or equal to 2.0 times with respect to the product thickness is preferably used.

In equation <1>, the sum of the square of the error is used for the evaluation function, but the sum of the absolute value of the error or the even square of the error may be used as the evaluation, or the sum of the error in which the weight is changed depending on the value such as the sum of the logarithm of the error may be used to reduce the weight of the abnormal thickness measurement value.

The approximate relationship is obtained as an initial value to be used in the estimation of the correspondence relationship between each thickness adjusting means 10 of the sheet and each thickness measuring position. In this case, it may be arbitrarily set through the correspondence relationship obtained through experience, final result in time of previous production and correspondence relationship obtained geometrically, and the methods described in patent document 1 and patent document 2. The relationship of the initial value and the true value is preferably not greatly deviated, and the correspondence relationship obtained through experience or the method described in patent document 2 is more preferable than the method described in patent document 1. However, as opposed to the method described in patent document 2, the initial value does not need to be set with an absolute precision. A determining method of selecting plural thickness adjusting means spaced apart to an extent they do not interfere, operating the selected thickness adjusting means to determine the location at where the thickness changes the most as the respective correspondence position, and interpolating the correspondence relationship of the thickness adjusting means selected with respect to the non-selected thickness adjusting means may be used.

The correspondence position in the transverse direction of the sheet before completion of stretching and after completion of stretching is then calculated from the thickness profile of before completion of stretching and the thickness profile of after stretching. In this case, an average profile of the thickness profiles obtained through plural scanning may be used. Furthermore, the thickness profile used in the exponential filter etc. for gradually reducing the influence of the past thickness measurement value as shown in FIG. 5 according to a predetermined rule such as a constant rate may be used in obtaining the correspondence position in the transverse direction of the sheet. According to such calculation, the influence of thickness unevenness in the running direction can be reduced from the thickness measurement value. For instance, the correspondence position in the transverse direction of the sheet is preferably calculated by calculating the average profile from the thickness profiles obtained through hundred or more scanning and using the calculated average thickness profile. Microscopic particles and cavities referred to as voids may be mixed to provide functions to the sheet thereby intentionally forming bumps far larger than the normal thickness distribution in the sheet, and thus simple average or weighted average may be obtained after removing the location where variation of the thickness measured from the time-series data of the thickness of each thickness measuring position is unusually large.

The obtained thickness distribution measurement value of the sheet before stretching and the sheet after stretching is applied to the evaluation function as measurement information, and the unknown parameter θ is obtained so that the evaluation function becomes a minimum. Specifically, the thickness profile Ts(xs) in the sheet before stretching, the thickness profile Tf(xf) in the sheet after stretching and θ are input, a function for creating the evaluation function of equation <1> is created, and the numerical value is calculated with a computer, so that θ for minimizing the evaluation function of equation <1> is obtained. Regarding such specific calculation, an arbitrary method such as Newton's method, quasi-Newton's method, or steepest descent method can be used. Here, the minimum value of the evaluation function is obtained, but if the setting of the initial value is appropriate, such value normally becomes the minimum value. Furthermore, that in which the error becomes a minimum (smallest) may be used when taking the maximum value (largest value) for the evaluation function. If the derivative value of the evaluation function can be directly obtained, the evaluation function itself does not need to be calculated.

Furthermore, it has been described that the absolute value of the thickness profile of the sheet before stretching, the absolute value of the thickness profile of the sheet after stretching, or the density of the sheet before stretching and the sheet after stretching are important since the correspondence relationship of the position in the transverse direction of the sheet of the sheet before stretching and the sheet after stretching is obtained based on the mass and the volume in the present embodiment, but actually, there are many problems such as the calibration of the thickness gauge is incorrect or the accuracy of the measurement of the density is not satisfactory. Similar problems arise in the method described in patent document 2, and thus skilled workers sometime change such density by hand. With respect to such problem, in the present invention, in place of equation <1>, a correction coefficient for correcting the density of the sheet after stretching with respect to the density of the sheet before stretching or the inaccuracy of the calibration of the thickness gauge, and the density distribution having a distribution in the transverse direction of the sheet may be estimated as unknown parameters, and the evaluation function of equation <2> can be used (in equation <2>, h(xf, θ) is a correction coefficient). However, since the fluctuation of the estimated mapping function becomes large, the density may also be estimated as unknown parameters only at the start of film forming, and other unknown parameters may be estimated thereafter with the density that is most likely to be reliable as known information from the estimated result.

In the method described above, if there is a thickness unevenness at both ends or if there is a uniform thickness unevenness in a region of the central part of the sheet (width of 80% in the transverse direction with the center of the sheet as the center), it is effective to estimate the correction coefficient related to density as unknown parameters. If there are barely any thickness unevenness or if there is thickness unevenness only at one arbitrary location at the central part of the sheet, estimation of the parameters related to density becomes difficult as parameters is estimated using the thickness unevenness as the information. As opposed to the estimation of the parameters related to density being difficult, the correspondence relationship of the position in the transverse direction of the sheet before stretching and after stretching is obtained based on the mass in the embodiment of the present invention, and thus the parameters related to density has large influence on the extension in the transverse direction of the mapping function. Thus, the parameters of the density is preferably estimated as hard as possible, that is, so that the fluctuation of the estimation result becomes small. To this end, a method of having the region for obtaining the error as the region sandwiched by the rising locations of the thickness of the sheet edge can be used when obtaining the evaluation function. With the use of such method, even if the thickness unevenness at the central part of the sheet is small, the thickness greatly changes and characteristic portion at both ends in the transverse direction of the sheet is included in the region of evaluation, whereby estimation of the parameters related to density becomes hard. Furthermore, all the unknown parameters including the parameters related to density obviously may be estimated only in the region including the rising region of the thickness of the edge of the sheet. In this case, the manipulated variable is determined based on the mapping function determined as above.

In this case, however, the influence of evaluation at the rising region of the edge becomes too large, and the weight on the evaluation at the central part becomes relatively small. A preliminary evaluation function (e.g., equation <2>) including the parameters related to density in the unknown parameters may be used in the above method, and a method of, after preliminarily obtaining the parameters related to density at the region including the rising region of the thickness of the edge of the sheet or the region contained at both ends, obtaining the error only at the region contained in the central part in the transverse direction of the sheet with the final evaluation function (e.g., equation <1>) having the parameters related to density as a known value and other unknown parameters as unknown and determining the final mapping function may be used. In the case of such embodiment, the density can be easily estimated by performing an approximation of being constant in the transverse direction in the sheet before stretching/after stretching.

A method of using the rising region of the thickness of the edge of the sheet cannot be applied to the film forming apparatus having a step of trimming the edge before thickness measurement after stretching. In such case, the following method of using the trimming position as the reference of the correspondence relationship can be used as a next best means. The flowchart is shown in FIG. 13. First, the position in the transverse direction to be trimmed after stretching and the position in the transverse direction before stretching corresponding thereto are preliminarily determined in a predictable range. Next, the parameters related to density is determined such that the correspondence relationship is obtained, and thereafter, estimation is performed based on the density, and the error in the mapping function in which error can be reduced is obtained. The position in the transverse direction before stretching corresponding to the position in the transverse direction trimmed after stretching can be preliminarily determined in the entire predictable range, and the error of each mapping function can be obtained to estimate the parameters related to density. This means that hard estimation can be performed by limiting the correspondence range at the position of trimming. However, the estimation accuracy lowers compared to when using the rising region of the edge, and thus the estimation may be temporarily stopped when the magnitude of the thickness unevenness is small.

When calculating the evaluation function, standardization may be performed with respect to the position in the transverse direction of the sheet before stretching and after stretching in an aim of stably calculating the numerical value. For instance, when obtaining the evaluation function in equation <1> or equation <2>, if xf is directly obtained as the position in the transverse direction in the actual sheet, the fifth order term etc. may over flow in the numerical value calculation and thus may not be optimally calculated since the position in the transverse direction of the sheet after stretching is large for an absolute value. The position in the transverse direction of the sheet after stretching is thus standardized within a predetermined range such as greater than or equal to −1 and smaller than or equal to 1 to more stably perform the numerical value calculation. The method of standardization is mathematically equivalent to when directly obtaining the same as the position in the transverse direction in the actual sheet.

The relationship satisfied by the thickness of the sheet after stretching is formulated and the error of the mapping function is evaluated with the sheet after stretching as a reference as described in equation <1> and the equation <2>, but obviously, the relationship satisfied by the thickness of the sheet after stretching may be formulated and the error of the mapping function may be evaluated with the sheet before stretching as a reference. These are mathematically equivalent.

The relationship of each thickness adjusting means set in advance and the correspondence position in the transverse direction of the sheet before stretching set is combined from the mapping function representing the obtained correspondence relationship of the position in the transverse direction of the sheet before stretching and the sheet after stretching, so that the correspondence relationship of each thickness adjusting means and the position in the transverse direction of the sheet after stretching can be obtained.

Therefore, the correspondence position in the transverse direction of the sheet in each thickness adjusting means and the sheet after stretching can be estimated on a steady basis without distributing the product forming film. The estimation result may be reflected on the thickness control every time the thickness gauge for measuring the thickness shape of the sheet after stretching updates the data of the thickness profile, or may be intermittently reflected on the thickness control while taking an interval of about one hour to two hours. Application can be continued while checking whether the result of estimating the correspondence position of the thickness adjusting means is right or wrong by intermittently reflecting the estimation result to the thickness control. Furthermore, a method of reflecting the estimation result on the thickness control only if the thickness unevenness in the transverse direction of the sheet is large and not performing feedback if the thickness unevenness is smaller than or equal to a threshold value defined in advance may be adopted. In the method of reflecting the estimation result only if the thickness unevenness is large, the influence of lowering in the precision of the estimated correspondence result due to small thickness unevenness can be reduced. Similarly, the estimation result can be reflected on the thickness control when the thickness unevenness is large and after a predetermined time has elapsed from reflecting the estimation result of the correspondence position in the transverse direction on the previous thickness control.

In a steady state, the correspondence position in the thickness profile in the thickness transverse direction of the sheet of the sheet after stretching of each thickness adjusting means can be monitored and corrected on a steady basis by repeating the above processes during film forming.

EXAMPLE

Example 1

One example in which the above described embodiment is applied to the sheet manufacturing process is shown below.

A biaxial stretched polyethylene telephtalate film for magnetic storage tape film having a thickness of 6 μm was manufactured using the sheet manufacturing facility shown in FIG. 4. A heat bolt type of adjusting the clearance 11 by thermally expanding and contracting a bolt incorporating a cartridge heater is used for the thickness adjusting means 10. The thickness distribution in the transverse direction of the sheet was measured while scanning in the transverse direction of the sheet using β-line thickness gauge using an absorption phenomenon of the β-line for the thickness gauge 8, and an X-line thickness gauge using an absorption phenomenon of the X-line for the thickness gauge 12. The thickness control was performed using PID control every time the thickness gauge 8 makes one scan in the transverse direction of the sheet. In performing the thickness control, the initial value of the correspondence relationship between each thickness adjusting means and the thickness measuring position that is necessary at first was used in the control as the initial value by greatly operating the specific thickness adjusting means, obtaining the position at where thickness change is the largest in the sheet after stretching, obtaining the correspondence relationship of each operated thickness adjusting means, and thereafter, obtaining the correspondence position of all the thickness adjusting means through interpolation.

(1) Setting of Mapping Function of the Position in the Transverse Direction of the Sheet Before Stretching and the Positioning the Transverse Direction of the Sheet after Stretching First, the thickness profile of the sheet before stretching and the thickness profile of the sheet after stretching of when the thickness unevenness of the sheet after stretching is controlled were compared through the above method. The result is as shown in FIG. 9. The thickness profile is substantially planar in the region in the transverse direction of the sheet in which the thickness is being controlled in the sheet after stretching, whereas the thickness profile of the sheet before stretching is a profile that is overall convex upwards but has a depression at the central part. Therefore, it is assumed therefrom that the stretching magnification in the transverse direction of the sheet is approximated with a fourth-order function, and the mapping function of the correspondence position in the transverse direction of the sheet before stretching and the correspondence position in the transverse direction of the sheet after stretching is set as a fifth-order polynomial equation where first-order integration of the fourth-order polynomial equation is performed as in the following equation <7>.

Equation 7

$$x_s = g(x_f, \theta) \qquad <7>$$
$$= \theta_0 + \theta_1 x_f + \theta_2 x_f^2 + \theta_3 x_f^3 + \theta_4 x_f^4 + \theta_5 x_f^5$$

where, xs: position in the transverse direction of the sheet before completion of stretching xf: position in the transverse direction of the sheet after completion of stretching g(xf, θ): mapping function, function expression when the position xs in the transverse direction of the sheet before completion of stretching is modeled to be represented with parameter θ as a function of the position xf in the transverse direction of the sheet after completion of stretching, θi: parameter of mapping function, i=integer of 0 to 5

(2) Regarding Evaluation Function of Similarity of Profile at the Correspondence Position of Before Stretching and after stretching Equation <2> was used for the evaluation function of evaluating the similarity of the profile at the correspondence position of before stretching and after stretching. The correction function h(θ) of equation <2> uses equation <8>.

Equation 8

$$h(\theta) = \theta_6 \qquad <8>$$

where, h(θ): correction function, function for correcting a ratio etc. of density of the sheet after stretching with respect to the density of the sheet before the sheet after stretching in the evaluation function for evaluating the error of the mapping function $\theta_6$: one of unknown parameters in the evaluation function corresponding to the ratio of the density of the sheet after stretching with respect to the density of the sheet before the sheet after stretching.

As shown in equation <2>, equation <7>, and equation <8>, the unknown parameters are added not only as the coefficient of the polynomial equation of the mapping function but also as the unknown parameters in the term representing the density ratio of the sheet after stretching and the sheet before stretching. Furthermore, the region in the sheet after stretching of when calculating the sum of the error is assumed as the region of 80% of the entire width of the sheet with the central part of the sheet in the transverse direction not including the edge at the sheet after stretching as the center, and xf for the central part is set to be between −1 and 1.

(3) Regarding Initial Value of Unknown Parameters Necessary for Numerical Value Calculation Regarding the unknown parameters of the mapping function representing the position in the transverse direction of the sheet before stretching and after stretching and the ratio of the density after stretching with respect to the density before stretching, the central part of the sheet after stretching and the sheet before stretching described in the patent document 2 is set as the reference correspondence position in a correspondence relationship, and the correspondence position is set so as to satisfy mass conservation of the thickness profile of the sheet before stretching and the thickness profile of the sheet after stretching. The parameters of the density ratio uses 1.04 for a general value of the biaxial stretched polyethylene telephtalate film.

(4) Measurement of Thickness Distribution Before and After Stretching

In the measurement of the thickness distribution, the thickness distribution in the transverse direction of the sheet was measured while scanning in the transverse direction of the sheet using the β-line thickness gauge using the absorption phenomenon of the β-line for the thickness gauge 8, and using the X-line thickness gauge using the absorption phenomenon of the X-line for the thickness gauge 12. The thickness profile used in the process thereafter is the thickness distribution before and after stretching using the average thickness profile of the thickness profile measured by the thickness gauge in one hour.

(5) Regarding Calculation of Unknown Parameters Such that Difference Between the Thickness Profiles of the Sheet Before Stretching and the Sheet after Stretching Become a Minimum The unknown parameters having the error of the thickness profile of the sheet before stretching and the sheet after stretching as a minimum is calculated through numerical value calculation from the thickness profile of the sheet before stretching and the sheet after stretching obtained from the process of (4). The Newton's method prepared in MATLAB of Mathworks Co. was used for the calculation.

(6) Update of Initial Parameters

The initial value was updated so that the unknown parameters having the evaluation function obtained by equation (5) as a minimum becomes the initial value used in the next numerical value calculation.

(7) Calculate Correspondence Relationship of the Thickness Adjusting Means and the Position in the Transverse Direction of the Sheet after Stretching The mapping function in the transverse direction of the sheet before and after stretching was uniquely determined from the parameters obtained by (5). The correspondence relationship of the thickness adjusting means that is relatively stable during sheet formation and the sheet before stretching was used to determine the correspondence relationship of the sheet after stretching and the thickness adjusting means. That is, since there is barely any influence of neck-in on the correspondence relationship in the transverse direction of the thickness adjusting means and the sheet before stretching at the central part of the sheet in advance, the correspondence position in the transverse direction of the thickness adjusting means and the sheet before stretching was set from a geometric correspondence. FIG. 7 is a view showing the relationship of the positions $21a$ to $21d$ of the thickness adjusting means in the die, the correspondence positions $20a$ to $20d$ in the thickness gauge of before stretching, and the correspondence positions $22a$ to $22d$ in the thickness gauge of after stretching. The position at where the thickness adjusting means corresponds the transverse direction of the sheet after stretching is calculated from both the mapping function of the position in the transverse direction of the sheet before and after stretching and the correspondence position in the transverse direction of the thickness adjusting means and the sheet before stretching.

(8) Feedback Correspondence Result of Thickness Adjusting Means to Thickness Control The feedback on the control is performed only when the difference between the maximum value and the minimum value of the average thickness profile of one hour exceeds 0.08 μm after one hour or longer has elapsed from one feedback of the correspondence result of the thickness adjusting means.

(6) Evaluation

The evaluation of the thickness unevenness is evaluated with the difference between maximum and minimum of the thickness with respect to the average thickness profile of two hours of the thickness profile at the central part.

The result is shown in FIG. 10. The result of applying the method described in patent document 2 of the prior art is also shown as a comparative example. FIG. 10 is a view showing transition of a thickness unevenness of when one embodiment of the present invention is applied during sheet manufacturing and transition of a thickness unevenness of when the prior art is applied during sheet manufacturing. Since the thickness unevenness is large at first from the start of film forming, the correspondence result of the thickness adjusting means is fed back every hour, and the correspondence result of the thickness adjusting means is not fed back thereafter for about one day. Subsequently, the thickness unevenness then gradually becomes larger, and after one day has elapsed, the thickness unevenness exceeds a threshold value and the correspondence result of the thickness adjusting means is fed back. Through film forming of seven days, after the thickness unevenness becomes smaller than the threshold value of performing feedback of the correspondence result of the thickness adjusting means once, the film is stably formed so that the maximum thickness unevenness becomes around the threshold value. If the method described in patent document 2 or the prior art is applied, even if the thickness unevenness becomes smaller than the threshold value at first, the thickness unevenness gradually degrades after one day has elapsed as shown in FIG. 10, and the thickness unevenness after elapse of seven days becomes large as shown in the figure compared to when the method of the present embodiment is used. This difference is based on a large difference in effect in that assumption is made that the center of the sheet before stretching and the center of the sheet after stretching always correspond in the technique of patent document 2, whereas it is not based on the relevant absolute correspondence relationship in the present embodiment and is based on the fact that an optimum mapping function in which the value of the evaluation function becomes a minimum value can be obtained. The technique of the present embodiment can be adapted to the actual situation of the sheet manufacturing process that the actual correspondence relationship of the central parts cannot be avoided from temporally fluctuating.

Example 2

Another example in which the embodiment of the present invention is applied to the sheet manufacturing process is shown. This example differs from example 1 in that after determining the parameters corresponding to the density using the central part or the region of 80% of the entire width of the sheet having the center of the sheet as the center and the rising part (region sandwiched by the central part end and the position having a thickness of 1.1 times with respect to the thickness of the central part) of the sheet edge positioned at both ends of the central part as the region for obtaining the sum of the error, other unknown parameters are determined using only the central part. FIG. 11 shows a flowchart of an algorithm for estimating the density ratio. In estimating the density ratio, the density ratio is changed from 0.99 by 0.01 up to 1.09, and the position of the sheet after stretching corresponding to the central position in the transverse direction of the sheet before stretching is changed as −50 mm, −40 mm, ..., +50 mm with the center in the transverse direction as a reference, and the mapping function is obtained using Law of mass conservation in the method described in (3) of example 1. The predicted thickness profile of after stretching is then calculated based on the matching function and the thickness profile of the sheet before stretching. The sum of the difference of the predicted thickness profile after stretching, the average thickness of the central part of the measured thickness profile after stretching, and the error of the rising position of the thickness edge is then obtained. The density ratio in which the error becomes the smallest then becomes the estimation result. Others are the same as the method described in example 1. As a result, even if the thickness unevenness is less than 0.08 μm, the parameters related to density can be stably obtained by using the feature of thickness change of the rising part of the edge, and the mapping function can be stably obtained.

INDUSTRIAL APPLICABILITY

The present invention is not limited to manufacturing of the plastic film, and may be applied to manufacturing of paper, the application range not being limited thereto.

The invention claimed is:

1. A sheet manufacturing method comprising the steps (1) to (5):
   (1) extruding a sheet material to a sheet form using a die including plural thickness adjusting means;
   (2) forming a desired sheet by performing a predetermined processing involving dimensional change in a transverse direction of a sheet;
   (3) measuring thickness distributions in the transverse direction of the sheet before completion and after completion of the predetermined processing;

(4) calculating a manipulated variable to be applied to the thickness adjusting means corresponding to each measuring position based on a thickness distribution measurement value in the transverse direction of the sheet after completion of the processing; and (5) controlling the thickness of the sheet by operating the thickness adjusting means by the manipulated variable; wherein in the calculation of the manipulated variable of step (4), a correspondence position in the transverse direction of the sheet after completion of the processing with respect to the thickness adjusting means is determined through the following steps A and B, and a thickness control is performed based on the determined correspondence position in the transverse direction of the sheet, A. obtaining unknown parameters such that an evaluation function including a mapping function representing a correspondence relationship between a position in the transverse direction of the sheet before completion of the processing and a position in the transverse direction of after completion of the processing and including one or more unknown parameters, a thickness distribution measurement value in the transverse direction of the sheet before completion of the processing, and a thickness distribution measurement value of after completion of the processing becomes an extreme value, and B. determining the mapping function based on the obtained unknown parameters and determining the corresponding position in the transverse direction of the sheet after completion of the processing with respect to the thickness adjusting means based on the determined mapping function.

2. The sheet manufacturing method according to claim 1, wherein the evaluation function uses that which corresponds to a total of a difference between a mass of the sheet material passing per unit time each part in the transverse direction of the sheet before completion of the processing and a mass of the sheet passing per unit time each part in the transverse direction of the sheet after completion of the processing.

3. The sheet manufacturing method according to claim 1, wherein the unknown parameters are determined to minimize or maximize the evaluation function using equation <1>or an equation mathematically equivalent thereto for the evaluation function, Equation 1

$$E(\theta) = \int_{x_{f_0}}^{x_{f_1}} \left\| \begin{array}{c} T_f(x_f) v_f D_f - \\ T_s(g(x_f, \theta)) \dfrac{dg(x_f, \theta)}{dx_f} v_s D_s \end{array} \right\|^2 dx_f \quad <1>$$

where

E: evaluation function representing an error of the mapping function $x_f$: position in the transverse direction of the sheet after completion of the processing $T_f(x_f)$: sheet thickness at position $x_f$ in the transverse direction of the sheet after completion of the processing $x_s$: position in the transverse direction of the sheet before completion of the processing $T_s(x_s)$: sheet thickness at position $x_s$ in the transverse direction of the sheet before completion of the processing θ: parameter vector in which the number of elements contained in the mapping function $g(x_f, \theta)$ is greater than or equal to one $g(x_f, \theta)$: mapping function, mathematical formula modeling the position $x_s$ in the transverse direction of the sheet before completion of the processing with parameter θ as a function of the position $x_f$ in the transverse direction of the sheet after completion of the processing $v_f$: speed in sheet running direction of after completion of the processing $v_s$: speed in sheet running direction of before completion of the processing $D_f$: sheet density after completion of the processing $D_s$: sheet density before completion of the processing $x_{f0}$: position in the transverse direction of the sheet after completion of the processing that becomes a starting point when calculating the error of the mapping function $x_{f1}$: position in the transverse direction of the sheet after completion of the processing that becomes a terminating point when calculating the error of the mapping function.

4. The sheet manufacturing method according to claim 3, wherein $g(x_f, \theta)$ is a polynomial equation related to $x_f$, and a coefficient of each term of the polynomial equation is each element of the parameter vector θ in the evaluation function.

5. The sheet manufacturing method according to claim 1, wherein prior to step A of step (4), the unknown parameters are preliminarily obtained so that a preliminary evaluation function of the mapping function becomes an extreme value, the preliminary evaluation function including a thickness distribution measurement value in the transverse direction of the sheet before completion of the processing, a thickness distribution measurement value of after completion of the processing, and that corresponding to a density of the sheet material of each part in the transverse direction of the sheet before completion of the processing and/or a density of after completion of the processing or a ratio thereof as unknown parameters, and the unknown parameters corresponding to the density of the sheet material of each part in the transverse direction of the sheet before completion of the processing and/or the density of after completion of the processing or the ratio thereof of the preliminarily obtained unknown parameters is determined; and in A of step (4), the mapping function is determined with the determined unknown parameters corresponding to the density of the sheet material of each part in the transverse direction of the sheet before completion of the processing and/or the density of after completion of the processing or the ratio thereof as known parameters.

6. The sheet manufacturing method according to any one of claims 5, wherein the unknown parameters are determined to minimize or maximize the evaluation function using equation <2>or an equation mathematically equivalent thereto for the evaluation function, Equation 2

$$E(\theta) \int_{x_{f_0}}^{x_{f_1}} \left\| T_f(x_f) v_f - T_s(g(x_f, \theta)) \dfrac{dg(x_f, \theta)}{dx_f} v_s h(\theta) \right\|^2 dx_f \quad <2>$$

where

E: evaluation function representing an error of the mapping function xf: position in the transverse direction of the sheet after completion of the processing Tf(xf): sheet thickness at position xf in the transverse direction of the sheet after completion of the processing xs: position in the transverse direction of the sheet before completion of the process Ts(xs): sheet thickness at position xs in the transverse direction of the sheet before completion of the processing θ: parameter vector in which the number of elements contained in the mapping function g(xf, θ) is greater than or equal to one g(xf, θ): mapping function, function representing the position xs in the transverse direction of the sheet before completion of the processing with the position xf in the transverse direction of the sheet after completion of processing and parameter θ h(xf, θ): function configured by the position xf in the transverse direction of the sheet after completion of processing and parameter θ in the evaluation function vf: speed in sheet running direction of after completion of the processing vs: speed in sheet running direction of before completion of the processing xf0: position in the transverse direction of the sheet after completion of the processing that becomes a starting point when calculating the error of the mapping function xf1: position in the transverse direction of the sheet after completion of the processing that becomes a terminating point when calculating the error of the mapping function.

7. The sheet manufacturing method according to claim 1, wherein the evaluation function includes the density of the sheet material of each part in the transverse direction of the sheet before completion of the processing and/or the density of after completion of the processing or the ratio thereof as unknown parameters.

8. The sheet manufacturing method according to claim 1, wherein only a region included at a central part is used as a region in the transverse direction of the sheet for obtaining the sum of the errors in the evaluation function.

9. The sheet manufacturing method according to claim 1, wherein a region substantially included at both ends of the sheet is used as a region in the transverse direction of the sheet for obtaining the sum of the errors in the evaluation function.

10. The sheet manufacturing method according to claim 1, wherein a central part and a region included in a rising part of a sheet edge positioned at both ends of the central part are used as a region in the transverse direction of the sheet for obtaining the sum of the errors in the evaluation function.

11. The sheet manufacturing method according to claims 1, wherein a value including a temporal weighted means and performed with averaging process is used as the thickness distribution measurement value.

12. A program comprising the steps (1) to (5):
(1) extruding a sheet material to a sheet form using a die including plural thickness adjusting means;
(2) forming a desired sheet by performing a predetermined processing involving dimensional change in a transverse direction of a sheet;
(3) measuring a thickness distribution in the transverse direction of the sheet before completion and after completion of the predetermined processing;
(4) calculating a manipulated variable to be applied to the thickness adjusting means corresponding to each measuring position based on a thickness distribution measurement value in the transverse direction of the sheet after completion of the processing; and
(5) controlling the thickness of the sheet by operating the thickness adjusting means by the manipulated variable; wherein
in the calculation of the manipulated variable of step (4), a correspondence position in the transverse direction of the sheet after completion of the processing with respect to the thickness adjusting means is determined through the program of the following steps A and B, and a thickness control is performed based on the determined correspondence position in the transverse direction of the sheet using a computer,
A. obtaining unknown parameters such that an evaluation function including a mapping function representing a correspondence relationship between a position in the transverse direction of the sheet before completion of the processing and a position in the transverse direction of after completion of the processing and including one or more unknown parameters, a thickness distribution measurement value in the transverse direction of the sheet before completion of the processing, and a thickness distribution measurement value of after completion of the processing becomes an extreme value, and
B. determining the mapping function based on the obtained unknown parameters and determining the corresponding position in the transverse direction of the sheet after completion of the processing with respect to the thickness adjusting means based on the determined mapping function.

13. A computer readable recording medium recorded with the program according to claim 12.

14. A computer comprising the program according to claim 12.

15. A sheet manufacturing device comprising means (1) to (6):
(1) die including plural thickness adjusting means for extruding a sheet material to a sheet form;
(2) processing device for performing a predetermined processing including stretching or foaming on the sheet shaped object;
(3) pre-processing thickness gauge for measuring a thickness distribution in the transverse direction of the sheet before completion of the processing;
(4) post-processing thickness gauge for measuring a thickness distribution in the transverse direction of the sheet after completion of the processing;
(5) computer for calculating an manipulated variable to be applied to the thickness adjusting means corresponding to each measuring position based on a measurement value of the post-processing thickness gauge; and
(6) control device for adding the manipulated variable calculated by the computer to the thickness adjusting means; wherein
in the calculation of the manipulated variable, the computer of (5) determines a correspondence position in the transverse direction of the sheet after completion of the processing with respect to the thickness adjusting means through a method of the following steps A and B, and performs a thickness control based on the determined correspondence position in the transverse direction of the sheet,
A. obtaining unknown parameters such that an evaluation function including a mapping function representing a correspondence relationship between a position in the transverse direction of the sheet before completion of the processing and a position in the transverse direction of after completion of the processing and including one or more unknown parameters, a thickness distribution measurement value in the transverse direction of the sheet before completion of the processing, and a thickness distribution measurement value of after completion of the processing becomes an extreme value, and B. determining the mapping function based on the obtained unknown parameters and determining the corresponding position in the transverse direction of the sheet after completion of the processing with respect to the thickness adjusting means based on the determined mapping function.

* * * * *

UNITED STATES PATENT AND TRADEMARK OFFICE
CERTIFICATE OF CORRECTION

| | |
|---|---|
| PATENT NO. | : 7,813,829 B2 |
| APPLICATION NO. | : 12/095419 |
| DATED | : October 12, 2010 |
| INVENTOR(S) | : Jiro Terao |

It is certified that error appears in the above-identified patent and that said Letters Patent is hereby corrected as shown below:

Column 28, claim 6 (original claim 9), "any one of" should be deleted. The "s" after claim should also be deleted.

Signed and Sealed this
Twenty-eighth Day of December, 2010

David J. Kappos
*Director of the United States Patent and Trademark Office*